US010200871B2

(12) United States Patent
Qian et al.

(10) Patent No.: US 10,200,871 B2
(45) Date of Patent: Feb. 5, 2019

(54) RADIO RESOURCE ALLOCATION METHOD AND RADIO NETWORK CONTROLLER

(71) Applicant: Huawei Technologies Co., Ltd., Shenzhen (CN)

(72) Inventors: Tianjin Qian, Hangzhou (CN); Yong Wang, Munich (DE); Zhuzhen Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 15/492,527

(22) Filed: Apr. 20, 2017

(65) Prior Publication Data

US 2017/0223546 A1   Aug. 3, 2017

Related U.S. Application Data

(63) Continuation of application No. PCT/CN2015/081676, filed on Jun. 17, 2015.

(30) Foreign Application Priority Data

Oct. 21, 2014 (CN) .......................... 2014 1 0561513

(51) Int. Cl.
G06F 15/16 (2006.01)
H04W 16/04 (2009.01)
(Continued)

(52) U.S. Cl.
CPC ............ H04W 16/04 (2013.01); G06F 15/16 (2013.01); G06F 15/161 (2013.01);
(Continued)

(58) Field of Classification Search
CPC ...... G06F 15/16; G06F 15/161; H04W 16/04; H04W 28/22; H04W 72/0446; H04W 72/0486
See application file for complete search history.

(56) References Cited

U.S. PATENT DOCUMENTS 8,601,297 B1* 12/2013 Abts ...................... H04L 69/14
713/320
2013/0219068 A1* 8/2013 Ballani ................. G06F 9/5061
709/226
2014/0018033 A1 6/2014 Luna

FOREIGN PATENT DOCUMENTS

CN    102469542 A    5/2012
CN    102652440 A    8/2012
(Continued)

OTHER PUBLICATIONS

Heller et al., ElasticTree: Saving Energy in Data Center Networks, Apr. 28, 2010 (Year: 2010).*

(Continued)

Primary Examiner — Jae Y Lee
Assistant Examiner — Aixa A Guadalupe Cruz
(74) Attorney, Agent, or Firm — Conley Rose, P.C.

(57) ABSTRACT

A radio resource allocation method and a radio network controller. The method includes obtaining transmission rate information of a plurality of links at time points t1, t2, ..., and tn, overall traffic volume information of the plurality of links in time periods T1, T2, ..., and Tm, and radio resource use information of each wireless transmission unit (WTU) in the plurality of WTUs, predicting a first transmission rate of a first link at a time point tn+1 in a time period Tm+1 according to the transmission rate information of the plurality of links at t1, t2, ..., and tn and the overall traffic volume information of the plurality of links in T1, T2, ..., and Tm, and determining a path that can satisfy a transmission rate requirement of the first link, and allocating a radio resource of the first link.

20 Claims, 12 Drawing Sheets

(51) Int. Cl.
  *H04W 72/04* (2009.01)
  *H04W 28/22* (2009.01)
(52) U.S. Cl.
  CPC ... *H04W 72/0446* (2013.01); *H04W 72/0486* (2013.01); *H04W 28/22* (2013.01)

(56) References Cited

FOREIGN PATENT DOCUMENTS

| CN | 102970714 A | 3/2013 |
|---|---|---|
| CN | 103873479 A | 6/2014 |
| WO | 0131938 A2 | 5/2001 |

OTHER PUBLICATIONS

Machine Translation and Abstract of Chinese Publication No. CN102469542, May 23, 2012, 15 pages.
Machine Translation and Abstract of Chinese Publication No. CN102652440, Aug. 29, 2012, 3 pages.
Machine Translation and Abstract of Chinese Publication No. CN103873479, Jun. 18, 2014, 16 pages.
Cui, Y., et al., "Dynamic Scheduling for Wireless Data Center Networks," IEEE Transactions on Parallel and Distributed Systems, vol. 24, No. 12, Dec. 2013, pp. 2365-2374.
Shin, J., et al., "On the Feasibility of Completely Wirelesss Datacenters," IEEE/ACM Transactions on Networking, vol. 21, No. 5, Oct. 2013, pp. 1666-1680.
Foreign Communication From a Counterpart Application, PCT Application No. PCT/CN2015/081676, English Translation of International Search Report dated Sep. 2, 2015, 2 pages.
Foreign Communication From a Counterpart Application, PCT Application No. PCT/CN2015/081676, English Translation of Written Opinion dated Sep. 2, 2015, 5 pages.
Machine Translation and Abstract of Chinese Publication No. CN102970714, Mar. 13, 2013, 13 pages.
Foreign Communication From a Counterpart Application, Chinese Application No. 201410561513.X, Chinese Office Action dated May 16, 2018, 3 pages.
Foreign Communication From a Counterpart Application, Chinese Application No. 201410561513.X, Chinese Search Report dated May 7, 2018, 2 pages.

* cited by examiner

WTU1-WTU2: 5 (4) [2]

WTU1-WTU3: 5 (4) [3]

WTU2-WTU4: 2 (3) [4]

WTU3-WTU4: 7 (3) [2]

WTU2-WTU3: 7 (3) [2]

WTU1-WTU4: 24 (3) [2]

WTU1-WTU2: 5 (4) [2]

WTU1-WTU3: 5 (4) [3]

WTU2-WTU4: 2 (3) [4]

WTU3-WTU4: 7 (3) [2]

WTU2-WTU3: 7 (3) [2]

WTU1-WTU4: 27 (0) [2]

WTU1-WTU2: 5 (4) [2]

WTU1-WTU3: 5 (4) [3]

WTU2-WTU4: 2 (3) [4]

WTU3-WTU4: 7 (3) [2]

WTU2-WTU3: 7 (3) [2]

WTU1-WTU4: 28.35 (0) [0.65]

RADIO RESOURCE ALLOCATION METHOD AND RADIO NETWORK CONTROLLER

CROSS-REFERENCE TO RELATED APPLICATIONS

This application is a continuation of International Patent Application No. PCT/CN2015/081676 filed on Jun. 17, 2015, which claims priority to Chinese Patent Application No. 201410561513.X filed on Oct. 21, 2014. The disclosures of the aforementioned applications are hereby incorporated by reference in their entireties.

TECHNICAL FIELD

Embodiments of the present disclosure relate to the communications field, and in particular, to a radio resource allocation method and a radio network controller.

BACKGROUND

A wireless technology is applied to a data center network (DCN) and is used to resolve an inherent problem in a wired data center. However, the wireless technology has disadvantages such as rapid attenuation of a high frequency signal and strong interference in a channel rate. Therefore, a related radio resource allocation method is required. A radio resource herein refers to a channel (a frequency) that can be used by an antenna in each direction.

In other approaches, a link establishment method in which a frequency resource is dynamically allocated, a frequency of an idle link is recycled, and a shortest path is found based on an antenna and a frequency usage is proposed. However, according to the method, a link rate requirement cannot be estimated in advance when a radio resource is being allocated, and can be adjusted only after congestion occurs, and the link rate requirement is not considered when a path is being selected or a radio resource is being allocated.

SUMMARY

Embodiments of the present disclosure provide a radio resource allocation method and a radio network controller, such that path selection and radio resource allocation can be performed on a link before congestion occurs, thereby improving resource use efficiency and radio network performance.

According to a first aspect, a radio resource allocation method is provided, where the method is applied to a data center network, the data center network includes multiple wireless transmission units (WTUs), and the method includes obtaining transmission rate information of multiple links in the data center network at time points t1, t2, ..., and tn, overall traffic volume information of the multiple links in time periods T1, T2, ..., and Tm, and radio resource use information of each WTU in the multiple WTUs, where each link in the multiple links is a transmission link between two WTUs in the multiple WTUs, each time period in the time periods T1, T2, ..., and Tm includes at least two time points in the time points t1, t2, ..., and tn, and any two time periods in the time periods T1, T2, ..., and Tm do not overlap in time, predicting a first transmission rate of a first link at a time point tn+1 in a time period Tm+1 according to the transmission rate information of the multiple links at the time points t1, t2, ..., and tn and the overall traffic volume information of the multiple links in the time periods T1, T2, ..., and Tm, where the first link is one of the multiple links, a time period Tj+1 is a time period following a time period Tj, a time point ti+1 is a time point following a time point ti, i and j are integers, $1 \leq i \leq n$, and $1 \leq j \leq m$, and determining a path that can satisfy a transmission rate requirement of the first link, and allocating a radio resource of the first link, according to the first transmission rate of the first link at the time point tn+1 and the radio resource use information of each WTU in the multiple WTUs.

With reference to the first aspect, in a first possible implementation manner, predicting a first transmission rate of a first link at a time point tn+1 in a time period Tm+1 according to the transmission rate information of the multiple links at the time points t1, t2, ..., and tn and the overall traffic volume information of the multiple links in the time periods T1, T2, ..., and Tm is further implemented as predicting a second transmission rate of the first link at the time point tn+1 according to the transmission rate information of the multiple links at the time points t1, t2, ..., and tn, predicting overall traffic volume information of the multiple links in the time period Tm+1 according to the overall traffic volume information of the multiple links in the time periods T1, T2, ..., and Tm, and modifying the second transmission rate of the first link at the time point tn+1 according to the overall traffic volume information of the multiple links in the time periods T1, T2, ..., Tm, and Tm+1, to obtain the first transmission rate of the first link at the time point tn+1.

With reference to the first aspect or the first possible implementation manner of the first aspect, in a second possible implementation manner, before predicting a first transmission rate of a first link at a time point tn+1 in a time period Tm+1 according to the transmission rate information of the multiple links at the time points t1, t2, ..., and tn and the overall traffic volume information of the multiple links in the time periods T1, T2, ..., and Tm, the method further includes determining the first link according to the transmission rate information of the multiple links at the time points t1, t2, ..., and tn, where the first link is a hot link in the multiple links, a total transmission rate of the hot link at the time points t1, t2, ..., and tn is greater than a value obtained by multiplying an average transmission rate of the multiple links at the time points t1, t2, ..., and tn by a predetermined coefficient, and the average transmission rate is an average value of total transmission rates of the multiple links at the time points t1, t2, ..., and tn.

With reference to the first aspect, the first possible implementation manner of the first aspect, or the second possible implementation manner of the first aspect, in a third possible implementation manner, after allocating a radio resource of the first link, the method further includes modifying a third transmission rate of a second link at the time point tn+1 according to the overall traffic volume information of the multiple links in the time periods T1, T2, ..., Tm, and Tm+1, to obtain a fourth transmission rate of the second link at the time point tn+1, where the second link is a link in the multiple links except the first link, determining a path that can satisfy a transmission rate requirement of the second link, and allocating a radio resource of the second link, according to the fourth transmission rate of the second link at the time point tn+1 and the radio resource use information of each WTU in the multiple WTUs.

With reference to the first aspect or any possible implementation manner in the first possible implementation manner of the first aspect to the third possible implementation manner of the first aspect, in a fourth possible implementation manner, the radio resource use information of each WTU includes a current transmission rate of each sub-direction antenna of the WTU, a current transmission rate of an allocated channel of each sub-direction antenna of the WTU, an available transmission rate increment of the allocated channel of each sub-direction antenna of the WTU, and an available transmission rate increment of a channel, which can be allocated but is not actually allocated, of each sub-direction antenna of the WTU, and obtaining radio resource use information of each WTU in the multiple WTUs is further implemented as obtaining a current transmission rate of each sub-direction antenna of each WTU in the multiple WTUs, obtaining a current transmission rate of an allocated channel of each sub-direction antenna of each WTU in the multiple WTUs, obtaining signal-to-noise ratios and bandwidth that are of the allocated channel and an unallocated channel of each sub-direction antenna of each WTU in the multiple WTUs, and obtaining an available transmission rate increment of the unallocated channel of each sub-direction antenna of each WTU in the multiple WTUs according to the signal-to-noise ratio and the bandwidth that are of the unallocated channel of each sub-direction antenna of each WTU in the multiple WTUs, obtaining an available transmission rate increment of the allocated channel of each sub-direction antenna of each WTU in the multiple WTUs according to the signal-to-noise ratio and the bandwidth of the allocated channel of each sub-direction antenna of each WTU in the multiple WTUs and the current transmission rate of the allocated channel of each sub-direction antenna of each WTU in the multiple WTUs, and obtaining an available transmission rate increment of each sub-direction antenna of each WTU in the multiple WTUs according to the available transmission rate increment of the unallocated channel of each sub-direction antenna of each WTU in the multiple WTUs and the available transmission rate increment of the allocated channel of each sub-direction antenna of each WTU in the multiple WTUs.

With reference to the fourth possible implementation manner of the first aspect, in a fifth possible implementation manner, the method further includes obtaining an available transmission rate increment of an allocated channel in an original transmission path of the first link, an available transmission rate increment of the original transmission path of the first link, and an available transmission rate increment of an unused transmission path of the first link according to the available transmission rate increment of each sub-direction antenna of each WTU in the multiple WTUs, and keeping the original transmission path and a channel of the first link unchanged, and allocating the radio resource of the first link if V>V1 and V≤V1+V2, keeping the original transmission path of the first link unchanged, adding a new channel resource to the original transmission path of the first link according to the available transmission rate increment of the allocated channel in the original transmission path of the first link and the available transmission rate increment of the original transmission path of the first link, until all transmission paths of the first link can satisfy a rate requirement of the first transmission rate, and allocating the radio resource of the first link if V>V1+V2 and V≤V1+V3, adding a new transmission path to the first link according to the available transmission rate increment of the allocated channel in the original transmission path of the first link, the available transmission rate increment of the original transmission path of the first link, and the available transmission rate increment of the unused transmission path of the first link, adding new channel resources to the original transmission path and the new transmission path of the first link, until all transmission paths of the first link can satisfy a rate requirement of the first transmission rate, and allocating the radio resource of the first link if V>V1+V3, keeping the original transmission path and a channel of the first link unchanged, and allocating the radio resource of the first link if V1−V≥0 and V1−V<V4, stopping using a first channel in an allocated channel of the first link, and allocating the radio resource of the first link if V1−V≥V4 and V1−V<V5, or stopping using all channels in a first transmission path of the first link, and allocating the radio resource of the first link if V1−V≥V5, where V is the first transmission rate, V1 is a sum of current transmission rates of all original transmission paths of the first link, V2 is a sum of available transmission rate increments of allocated channels in all the original transmission paths of the first link, V3 is an available transmission rate increment of the first transmission path of the first link, V4 is a current transmission rate of a first channel in allocated channels in all the transmission paths of the first link, and V5 is a current transmission rate of the first transmission path of the first link.

With reference to the first aspect or any possible implementation manner in the first possible implementation manner of the first aspect to the fifth possible implementation manner of the first aspect, in a sixth possible implementation manner, specific implementation includes a start time point and an end time point of each time period in the time periods T1, T2, ..., and Tm are two time points in the time points t1, t2, ..., and tn.

According to a second aspect, a radio network controller is provided, where the radio network controller is located in a data center network, the data center network includes multiple WTUs, and the radio network controller includes an obtaining unit configured to obtain transmission rate information of multiple links in the data center network at time points t1, t2, ..., and tn, overall traffic volume information of the multiple links in time periods T1, T2, ..., and Tm, and radio resource use information of each WTU in the multiple WTUs, where each link in the multiple links is a transmission link between two WTUs in the multiple WTUs, each time period in the time periods T1, T2, ..., and Tm includes at least two time points in the time points t1, t2, ..., and tn, any two time periods in the time periods T1, T2, ..., and Tm do not overlap in time, and a start time point and an end time point of each time period in the time periods T1, T2, ..., and Tm are two time points in the time points t1, t2, ..., and tn, a prediction unit configured to predict a first transmission rate of a first link at a time point tn+1 in a time period Tm+1 according to the transmission rate information of the multiple links at the time points t1, t2, ..., and tn and the overall traffic volume information of the multiple links in the time periods T1, T2, ..., and Tm, where the first link is one of the multiple links, a time period Tj+1 is a time period following a time period Tj, a time point ti+1 is a time point following a time point ti, i and j are integers, 1≤i≤n, and 1≤j≤m, and a radio resource scheduling unit configured to determine a path that can satisfy a transmission rate requirement of the first link, and allocate a radio resource of the first link, according to the first transmission rate of the first link at the time point tn+1 and the radio resource use information of each WTU in the multiple WTUs.

With reference to the second aspect, in a first possible implementation manner, the prediction unit includes a first prediction subunit configured to predict a second transmission rate of the first link at the time point tn+1 according to the transmission rate information of the multiple links at the time points t1, t2, ..., and tn, a second prediction subunit configured to predict overall traffic volume information of the multiple links in the time period Tm+1 according to the overall traffic volume information of the multiple links in the time periods T1, T2, . . . , and Tm, and a prediction and modification subunit configured to modify the second transmission rate of the first link at the time point tn+1 according to the overall traffic volume information of the multiple links in the time periods T1, T2, . . . , Tm, and Tm+1, to obtain the first transmission rate of the first link at the time point tn+1.

With reference to the second aspect or the first possible implementation manner of the second aspect, in a second possible implementation manner, the radio network controller further includes a hot link determining unit, and the hot link determining unit is configured to determine the first link according to the transmission rate information of the multiple links at the time points t1, t2, . . . , and tn, where the first link is a hot link in the multiple links, a total transmission rate of the hot link at the time points t1, t2, . . . , and tn is greater than a value obtained by multiplying an average transmission rate of the multiple links at the time points t1, t2, . . . , and tn by a predetermined coefficient, and the average transmission rate is an average value of total transmission rates of the multiple links at the time points t1, t2, . . . , and tn.

With reference to the second aspect, the first possible implementation manner of the second aspect, or the second possible implementation manner of the second aspect, in a third possible implementation manner, the radio resource use information of each WTU includes a current transmission rate of each sub-direction antenna of the WTU, a current transmission rate of an allocated channel of each sub-direction antenna of the WTU, an available transmission rate increment of the allocated channel of each sub-direction antenna of the WTU, and an available transmission rate increment of a channel, which can be allocated but is not actually allocated, of each sub-direction antenna of the WTU, and the obtaining unit is further configured to obtain a current transmission rate of each sub-direction antenna of each WTU in the multiple WTUs, obtain a current transmission rate of an allocated channel of each sub-direction antenna of each WTU in the multiple WTUs, obtain signal-to-noise ratios and bandwidth of the allocated channel and an unallocated channel of each sub-direction antenna of each WTU in the multiple WTUs, and obtain an available transmission rate increment of the unallocated channel of each sub-direction antenna of each WTU in the multiple WTUs according to the signal-to-noise ratio and the bandwidth of the unallocated channel of each sub-direction antenna of each WTU in the multiple WTUs, obtain an available transmission rate increment of the allocated channel of each sub-direction antenna of each WTU in the multiple WTUs according to the signal-to-noise ratio and the bandwidth that are of the allocated channel of each sub-direction antenna of each WTU in the multiple WTUs and the current transmission rate of the allocated channel of each sub-direction antenna of each WTU in the multiple WTUs, and obtain an available transmission rate increment of each sub-direction antenna of each WTU in the multiple WTUs according to the available transmission rate increment of the unallocated channel of each sub-direction antenna of each WTU in the multiple WTUs and the available transmission rate increment of the allocated channel of each sub-direction antenna of each WTU in the multiple WTUs.

With reference to the second aspect or any possible implementation manner in the first possible implementation manner of the second aspect to the third possible implementation manner of the second aspect, in a fourth possible implementation manner, the obtaining unit is further configured to obtain an available transmission rate increment of an allocated channel in an original transmission path of the first link, an available transmission rate increment of the original transmission path of the first link, and an available transmission rate increment of an unused transmission path of the first link according to the available transmission rate increment of each sub-direction antenna of each WTU in the multiple WTUs, and the radio resource scheduling unit is further configured to determine a path that can satisfy a transmission rate requirement of the first link, and allocate a radio resource of the first link, according to the first transmission rate of the first link at the time point tn+1 and the radio resource use information of each WTU in the multiple WTUs includes that if $V>V1$ and $V\le V1+V2$, keep the original transmission path and a channel of the first link unchanged, and allocate the radio resource of the first link, if $V>V1+V2$ and $V\le V1+V3$, keep the original transmission path of the first link unchanged, add a new channel resource to the original transmission path of the first link according to the available transmission rate increment of the allocated channel in the original transmission path of the first link and the available transmission rate increment of the original transmission path of the first link, until all transmission paths of the first link can satisfy a rate requirement of the first transmission rate, and allocate the radio resource of the first link, if $V>V1+V3$, add a new transmission path to the first link according to the available transmission rate increment of the allocated channel in the original transmission path of the first link, the available transmission rate increment of the original transmission path of the first link, and the available transmission rate increment of the unused transmission path of the first link, add new channel resources to the original transmission path and the new transmission path of the first link, until all transmission paths of the first link can satisfy a rate requirement of the first transmission rate, and allocate the radio resource of the first link, if $V1-V\ge 0$ and $V1-V<V4$, keep the original transmission path and a channel of the first link unchanged, and allocate the radio resource of the first link, if $V1-V\ge V4$ and $V1-V<V5$, stop using a first channel in an allocated channel of the first link, and allocate the radio resource of the first link, or if $V1-V\ge V5$, stop using all channels in a first transmission path of the first link, and allocate the radio resource of the first link, where V is the first transmission rate, V1 is a sum of current transmission rates of all original transmission paths of the first link, V2 is a sum of available transmission rate increments of allocated channels in all the original transmission paths of the first link, V3 is an available transmission rate increment of the first transmission path of the first link, V4 is a current transmission rate of a first channel in allocated channels in all the transmission paths of the first link, and V5 is a current transmission rate of the first transmission path of the first link.

With reference to the second aspect or any possible implementation manner in the first possible implementation manner of the second aspect to the fourth possible implementation manner of the second aspect, in a fifth possible implementation manner, specific implementation includes a start time point and an end time point of each time period in the time periods T1, T2, . . . , and Tm are two time points in the time points t1, t2, . . . , and tn.

Based on the foregoing technical solutions, according to the radio resource allocation method and the radio network controller in the embodiments of the present disclosure, a transmission rate of a link at at least one future time point is predicted, a selection path of the link is determined, and a radio resource of the link is allocated, according to historical overall traffic volume information and historical rate information of multiple links in a data center network and radio resource use information of each WTU, such that path selection and radio resource allocation can be performed on a link before congestion occurs, thereby improving resource use efficiency and radio network performance.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

For ease of understanding the embodiments of the present disclosure, some elements that may be introduced in descriptions of the embodiments of the present disclosure are described herein first.

Link: A data center network may include multiple WTUs, and a link refers to a network transmission link between two WTUs in the data center network. Each link may include one or more transmission paths.

Sub-direction path: A transmission path of a link is a sub-direction path of the link. For example, if a link from a WTU1 to a WTU4 includes paths WTU1→WTU4, WTU1→WTU2→WTU4, and WTU1→WTU3→WTU4, WTU1→WTU4 is a sub-direction path of the link from the WTU1 to the WTU4, WTU1→WTU2→WTU4 is a sub-direction path of the link from the WTU1 to the WTU4, and WTU1→WTU3→WTU4 is also a sub-direction path of the link from the WTU1 to the WTU4.

Sub-direction antenna: In a WTU, antenna resources may exist in different directions. An antenna in a sub-direction of a WTU includes all antenna resources of the WTU in the sub-direction. For example, if a link from a WTU1 to a WTU4 includes paths WTU1→WTU4, WTU1→WTU2→WTU4, and WTU1→WTU3→WTU4, three groups of sub-direction antennas exist in the WTU1, and point to the WTU4, the WTU2, and the WTU3 respectively.

Figure 1:
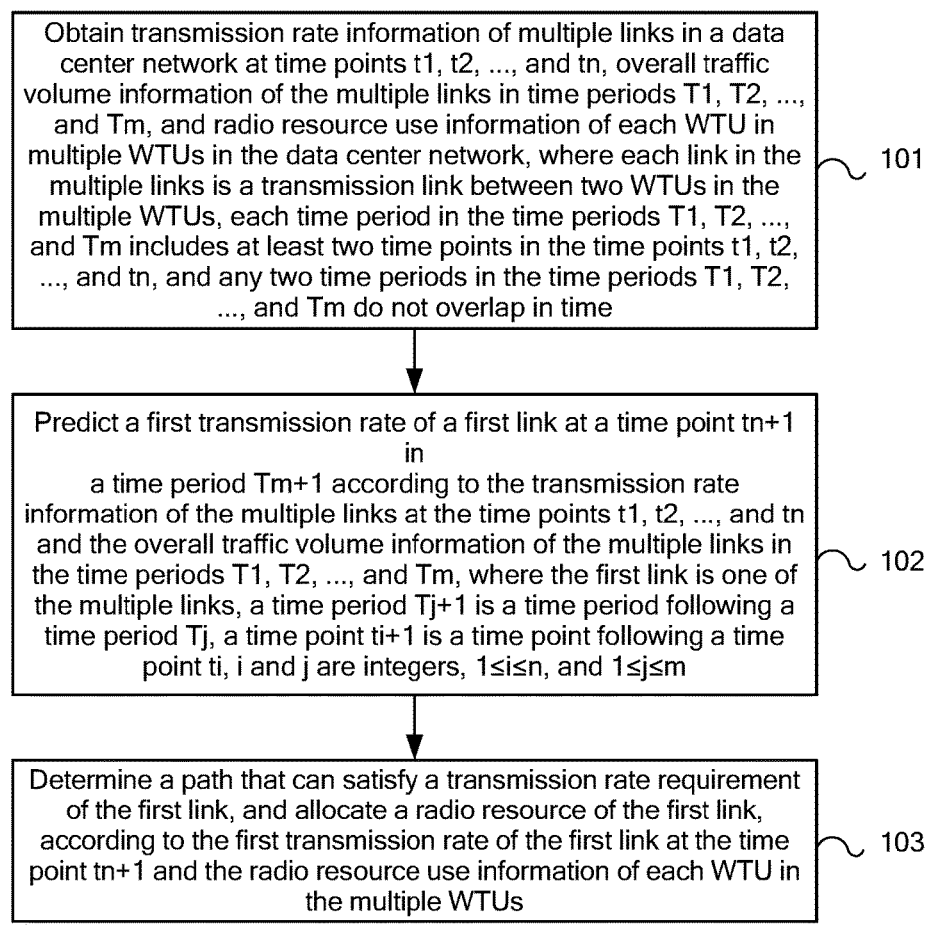
FIG. 1 is a flowchart of a radio resource allocation method according to an embodiment of the present disclosure.

FIG. 1 is a flowchart of a radio resource allocation method according to an embodiment of the present disclosure. The method in FIG. 1 is applied to a data center network, the data center network includes multiple WTUs, and the method is executed by a radio network controller. The method includes the following steps.

Step 101: Obtain transmission rate information of multiple links in the data center network at time points t1, t2, . . . , and tn, overall traffic volume information of the multiple links in time periods T1, T2, . . . , and Tm, and radio resource use information of each WTU in the multiple WTUs in the data center network, where each link in the multiple links is a transmission link between two WTUs in the multiple WTUs, each time period in the time periods T1, T2, . . . , and Tm includes at least two time points in the time points t1, t2, . . . , and tn, and any two time periods in the time periods T1, T2, . . . , and Tm do not overlap in time.

Figure 2:
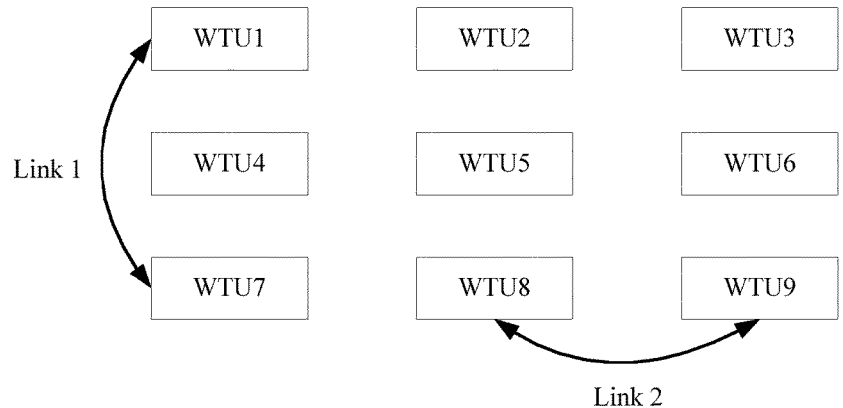
FIG. 2 is a schematic diagram of a link in a data center network according to an embodiment of the present disclosure.

In the WTUs in the data center network, there may be a link between any two WTUs. FIG. 2 is a schematic diagram of a link in a data center network according to an embodiment of the present disclosure. As shown in FIG. 2, a link between a WTU1 and a WTU7 is a link 1, and a link between a WTU8 and a WTU9 is a link 2. Each link may include one or more sub-direction paths. For example, the link 1 may include a path WTU1→WTU4→WTU7, a path WTU1→WTU5→WTU7, and the like.

It should be understood that, that any two time periods in the time periods T1, T2, . . . , and Tm do not overlap in time means that no common time period intersection set exists in time between the any two time periods in the time periods T1, T2, . . . , and Tm. It should be specially noted that when in two time periods, an end point of a first time period is a start point of a second time period also belongs to when the two time periods do not overlap.

Step 102: Predict a first transmission rate of a first link at a time point tn+1 in a time period Tm+1 according to the transmission rate information of the multiple links at the time points t1, t2, ..., and tn and the overall traffic volume information of the multiple links in the time periods T1, T2, ..., and Tm, where the first link is one of the multiple links, a time period Tj+1 is a time period following a time period Tj, a time point ti+1 is a time point following a time point ti, i and j are integers, 1≤i≤n, and 1≤j≤m.

Step 103: Determine a path that can satisfy a transmission rate requirement of the first link, and allocate a radio resource of the first link, according to the first transmission rate of the first link at the time point tn+1 and the radio resource use information of each WTU in the multiple WTUs.

It should be understood that a radio resource of a link includes an antenna resource in each sub-direction of a WTU and a channel resource of each sub-direction antenna. A sub-direction antenna of the WTU may include one or more antennas.

In this embodiment of the present disclosure, a transmission rate of a link at at least one future time point is predicted, a selection path of the link is determined, and a radio resource of the link is allocated, according to historical overall traffic volume information and historical rate information of multiple links in a data center network and radio resource use information of each WTU, such that path selection and radio resource allocation can be performed on a link before congestion occurs, thereby improving resource use efficiency and radio network performance.

Optionally, a start time point and an end time point of each time period in the time periods T1, T2, ..., and Tm are two time points in the time points t1, t2, ..., and tn.

Figure 3:
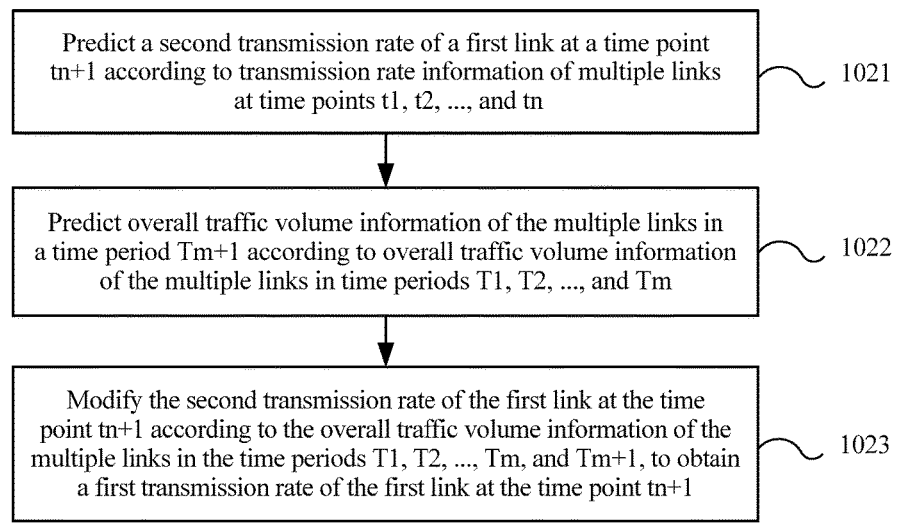
FIG. 3 is a flowchart of a method for predicting a link transmission rate according to an embodiment of the present disclosure.

Optionally, in an embodiment, as shown in FIG. 3, step 102 may be further implemented in the following steps.

Step 1021: Predict a second transmission rate of the first link at the time point tn+1 according to the transmission rate information of the multiple links at the time points t1, t2, ..., and tn.

Step 1022: Predict overall traffic volume information of the multiple links in the time period Tm+1 according to the overall traffic volume information of the multiple links in the time periods T1, T2, ..., and Tm.

Step 1023: Modify the second transmission rate of the first link at the time point tn+1 according to the overall traffic volume information of the multiple links in the time periods T1, T2, ..., Tm, and Tm+1, to obtain the first transmission rate of the first link at the time point tn+1.

An overall traffic volume of a first link in a future time period is predicted according to overall traffic volumes of the first link in multiple time periods, a transmission rate of the first link at a future time point in the future time period is predicted according to transmission rates of the first link at multiple time points, and then the transmission rate at the future time point is modified according to the overall traffic volume of the first link in the future time period, such that a relatively accurate predicted value of the transmission rate at the future time point can be obtained.

It should be understood that, according to the method in this embodiment of the present disclosure, the transmission rates at the multiple time points in the future time period may be predicted.

In a specific application, a maximum transmission rate value in the transmission rates may be selected as a parameter for determining a path of the first link.

Figure 4:
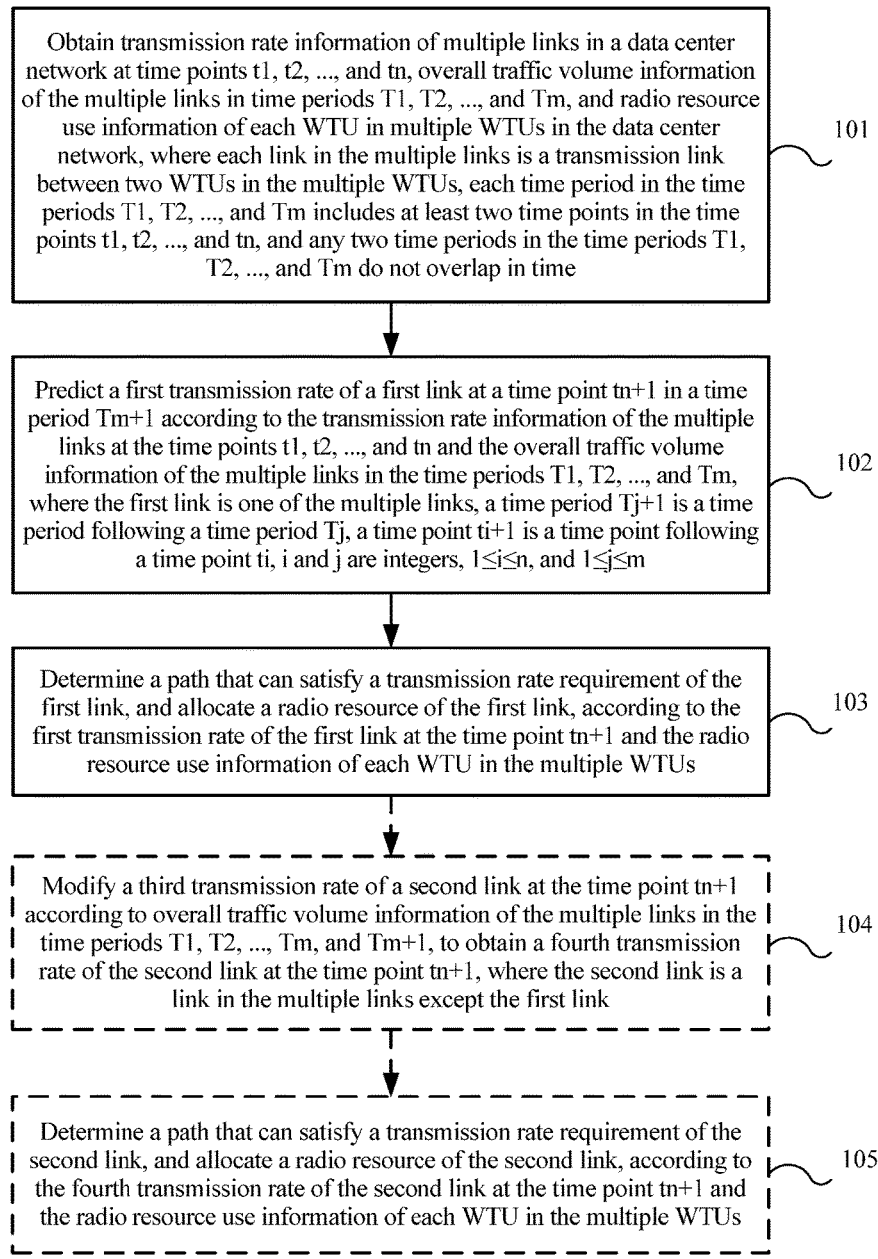
FIG. 4 is a flowchart of another radio resource allocation method according to an embodiment of the present disclosure.

Optionally, as shown in FIG. 4, after step 103, the method may further include the following steps.

Step 104: Modify a third transmission rate of a second link at the time point tn+1 according to the overall traffic volume information of the multiple links in the time periods T1, T2, ..., Tm, and Tm+1, to obtain a fourth transmission rate of the second link at the time point tn+1, where the second link is a link in the multiple links except the first link.

Step 105: Determine a path that can satisfy a transmission rate requirement of the second link, and allocate a radio resource of the second link, according to the fourth transmission rate of the second link at the time point tn+1 and the radio resource use information of each WTU in the multiple WTUs.

It should be understood that after a radio resource of a link is allocated, a radio resource of a remaining link may further be allocated.

Figure 5:
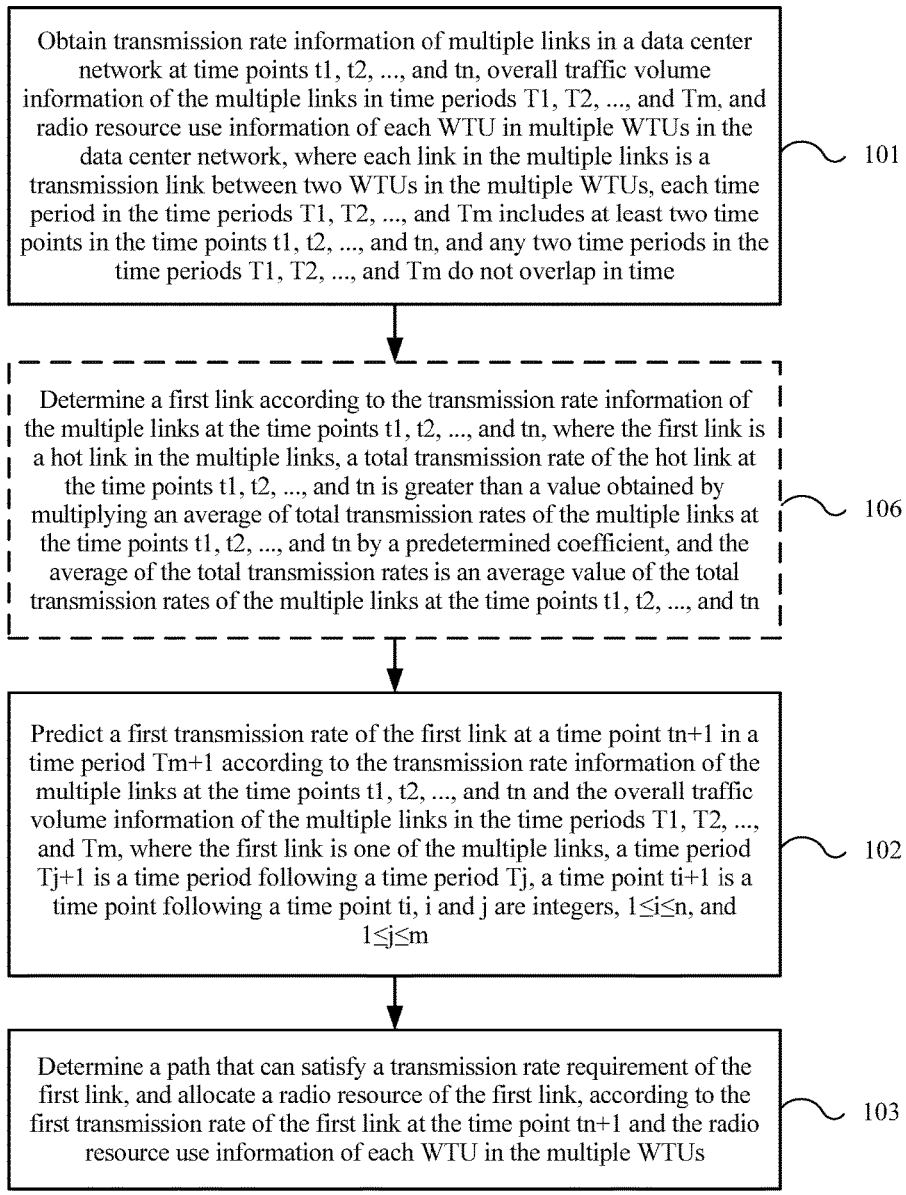
FIG. 5 is a flowchart of another radio resource allocation method according to an embodiment of the present disclosure.

Optionally, as shown in FIG. 5, before step 102, the method may further include the following step.

Step 106: Determine the first link according to the transmission rate information of the multiple links at the time points t1, t2, ..., and tn, where the first link is a hot link in the multiple links, a total transmission rate of the hot link at the time points t1, t2, ..., and tn is greater than a value obtained by multiplying an average transmission rate of the multiple links at the time points t1, t2, ..., and tn by a predetermined coefficient, and the average transmission rate is an average value of total transmission rates of the multiple links at the time points t1, t2, ..., and tn.

It should be understood that a total transmission rate of a link at the time points t1, t2, ..., and tn refers to a sum of transmission rates of the link at the time points t1, t2, ..., and tn.

Further, the predetermined coefficient may be a preset value. Generally, the total transmission rate of the hot link should be greater than an average transmission rate of all links. That is, the predetermined coefficient should be a value greater than 1, such as 1.5, 2, or 3.

It should be understood that a radio resource requirement of a hot service can be fully satisfied by preferentially processing a hot link, thereby improving service performance of a data center network.

Further, in this embodiment of the present disclosure, the radio resource use information of each WTU includes a current transmission rate of each sub-direction antenna of the WTU, a current transmission rate of an allocated channel of each sub-direction antenna of the WTU, an available transmission rate increment of the allocated channel of each sub-direction antenna of the WTU, and an available transmission rate increment of a channel, which can be allocated but is not actually allocated, of each sub-direction antenna of the WTU. In this case, step 101 may include obtaining a current transmission rate of each sub-direction antenna of each WTU in the multiple WTUs, obtaining a current transmission rate of an allocated channel of each sub-direction antenna of each WTU in the multiple WTUs, obtaining signal-to-noise ratios and bandwidth that are of the allocated channel and an unallocated channel of each sub-direction antenna of each WTU in the multiple WTUs, and obtaining an available transmission rate increment of the unallocated channel of each sub-direction antenna of each WTU in the multiple WTUs according to the signal-to-noise ratio and the bandwidth that are of the unallocated channel of each sub-direction antenna of each WTU in the multiple WTUs, obtaining an available transmission rate increment of the allocated channel of each sub-direction antenna of each WTU in the multiple WTUs according to the signal-to-noise ratio and the bandwidth that are of the allocated channel of each sub-direction antenna of each WTU in the multiple WTUs and the current transmission rate of the allocated channel of each sub-direction antenna of each WTU in the multiple WTUs, and obtaining an available transmission rate increment of each sub-direction antenna of each WTU in the multiple WTUs according to the available transmission rate increment of the unallocated channel of each sub-direction antenna of each WTU in the multiple WTUs and the available transmission rate increment of the allocated channel of each sub-direction antenna of each WTU in the multiple WTUs.

It should be understood that a current transmission rate is a transmission rate at a current moment. For example, a current transmission rate of a link refers to a transmission rate of the link at a current moment, a current transmission rate of a sub-direction antenna of a link refers to a transmission rate of the sub-direction antenna of the link at a current moment, and a current transmission rate of a channel refers to a transmission rate of the channel at a current moment.

In addition, a transmission rate basically does not change when a time interval between a sampling time point and a current moment is short enough. In this case, a transmission rate obtained at the sampling time point may be regarded as a current transmission rate.

Optionally, the method may further include obtaining an available transmission rate increment of an allocated channel in an original transmission path of the first link, an available transmission rate increment of the original transmission path of the first link, and an available transmission rate increment of an unused transmission path of the first link according to the available transmission rate increment of each sub-direction antenna of each WTU in the multiple WTUs.

It should be understood that, when a transmission path includes multiple segmented paths (connected in series), a transmission rate of the transmission path is a minimum transmission rate of the segmented paths of the transmission path. FIG. 2 is used as an example.

It is assumed that the first link is a network transmission link between a WTU1 and a WTU9, and WTU1→WTU5→WTU9 is a transmission path of the first link. Assuming that a transmission rate of a segmented path WTU1→WTU5 is 10 and a transmission rate of a segmented path WTU5→WTU9 is 5, a transmission rate of the transmission path WTU1→WTU5→WTU9 is 5.

Similarly, an available transmission rate increment of an allocated channel in a transmission path is equal to a minimum available transmission rate increment of an allocated channel in a segmented path of the transmission path, and an available transmission rate increment of a transmission path is equal to a minimum available transmission rate increment of a segmented path of the transmission path.

Optionally, in an embodiment, step 103 is further implemented as keeping the original transmission path and a channel of the first link unchanged, and allocating the radio resource of the first link if $V>V1$ and $V \leq V1+V2$. V is the first transmission rate, V1 is a sum of current transmission rates of all original transmission paths of the first link, and V2 is a sum of available transmission rate increments of allocated channels in all the original transmission paths of the first link.

Optionally, in another embodiment, step 103 is further implemented as keeping the original transmission path of the first link unchanged, adding a new channel resource to the original transmission path of the first link according to the available transmission rate increment of the allocated channel in the original transmission path of the first link and the available transmission rate increment of the original transmission path of the first link, until all transmission paths of the first link can satisfy a rate requirement of the first transmission rate, and allocating the radio resource of the first link if $V>V1+V2$ and $V \leq V1+V3$. V is the first transmission rate, V1 is a sum of current transmission rates of all original transmission paths of the first link, V2 is a sum of available transmission rate increments of allocated channels in all the original transmission paths of the first link, and V3 is an available transmission rate increment of a first transmission path of the first link.

Optionally, in another embodiment, step 103 is further implemented as adding a new transmission path to the first link according to the available transmission rate increment of the allocated channel in the original transmission path of the first link, the available transmission rate increment of the original transmission path of the first link, and the available transmission rate increment of the unused transmission path of the first link, adding new channel resources to the original transmission path and the new transmission path of the first link, until all transmission paths of the first link can satisfy a rate requirement of the first transmission rate, and allocating the radio resource of the first link if $V>V1+V3$. V is the first transmission rate, V1 is a sum of current transmission rates of all original transmission paths of the first link, and V3 is an available transmission rate increment of a first transmission path of the first link.

Optionally, in another embodiment, step 103 is further implemented as keeping the original transmission path and a channel of the first link unchanged, and allocating the radio resource of the first link if $V1-V \geq 0$ and $V1-V<V4$. V is the first transmission rate, V1 is a sum of current transmission rates of all original transmission paths of the first link, and V4 is a current transmission rate of a first channel in allocated channels in all transmission paths of the first link.

Optionally, in another embodiment, step 103 is further implemented as stopping using a first channel in an allocated channel of the first link, and allocating the radio resource of the first link if $V1-V \geq V4$ and $V1-V<V5$. V is the first transmission rate, V1 is a sum of current transmission rates of all original transmission paths of the first link, V4 is a current transmission rate of a first channel in allocated channels in all transmission paths of the first link, and V5 is a current transmission rate of a first transmission path of the first link.

Optionally, in another embodiment, step 103 is further implemented as stopping using all channels in a first transmission path of the first link, and allocating the radio resource of the first link if $V1-V \geq V5$. V is the first transmission rate, V1 is a sum of current transmission rates of all original transmission paths of the first link, and V5 is a current transmission rate of the first transmission path of the first link.

Further, if a first antenna that does not transmit or receive any channel exists in a first sub-direction antenna of a first WTU of the first link, the first antenna is disabled. It should be understood that the first WTU of the first link refers to a WTU that a transmission path of the first link passes through.

Optionally, the method further includes updating radio resource use information of a WTU related to the first link after the path that can satisfy the transmission rate requirement of the first link is determined and the radio resource of the first link is allocated.

Preferably, time intervals between any two adjacent time points in the time points t1, t2, . . . , and to are equal.

Preferably, time lengths of the time periods T1, T2, ..., and Tm are equal.

The following further describes the method in this embodiment of the present disclosure with reference to specific embodiments.

Figure 6A:
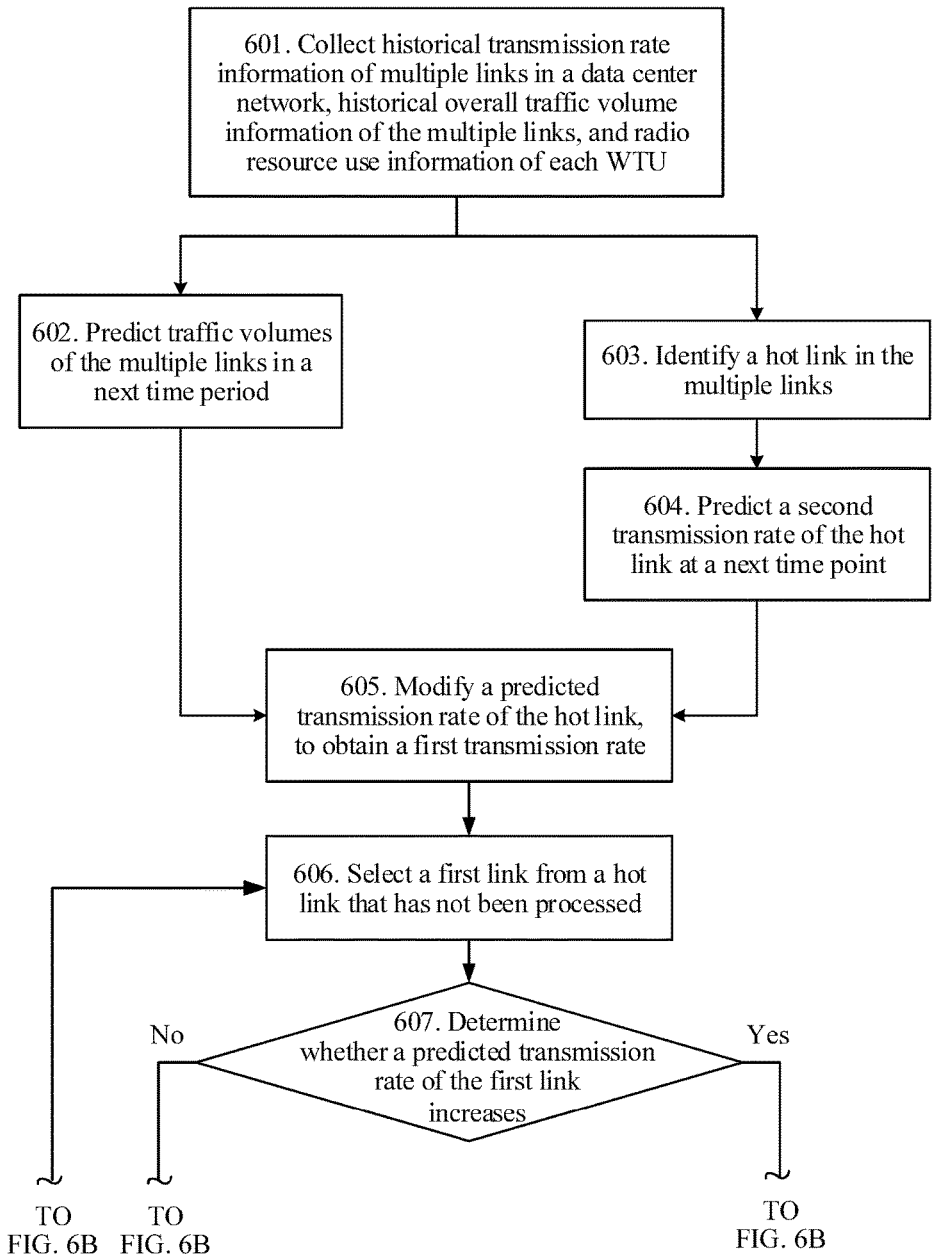
FIG. 6A, FIG. 6B, and FIG. 6C are a specific flowchart of a radio resource allocation method according to an embodiment of the present disclosure.
Figure 6B:
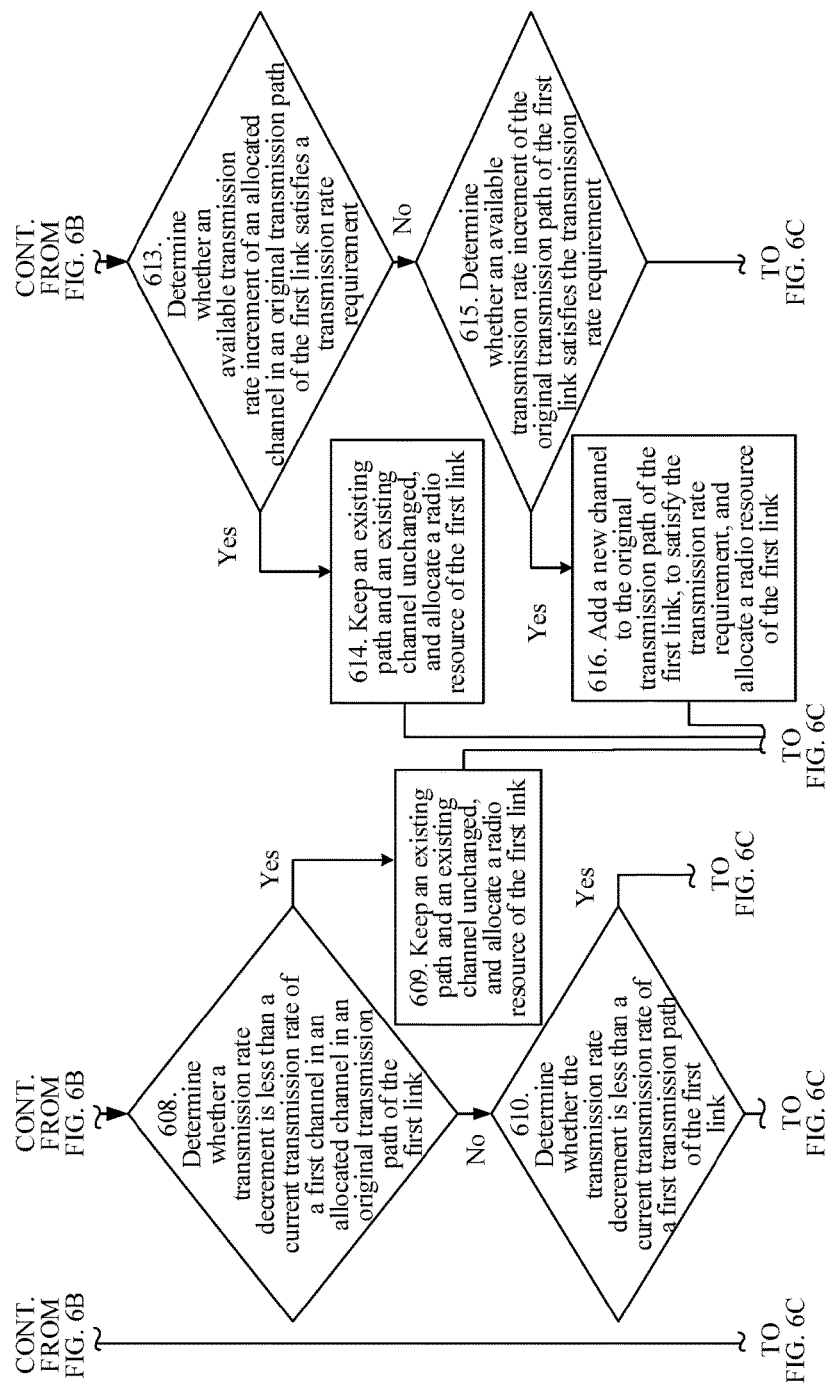
Figure 6C:
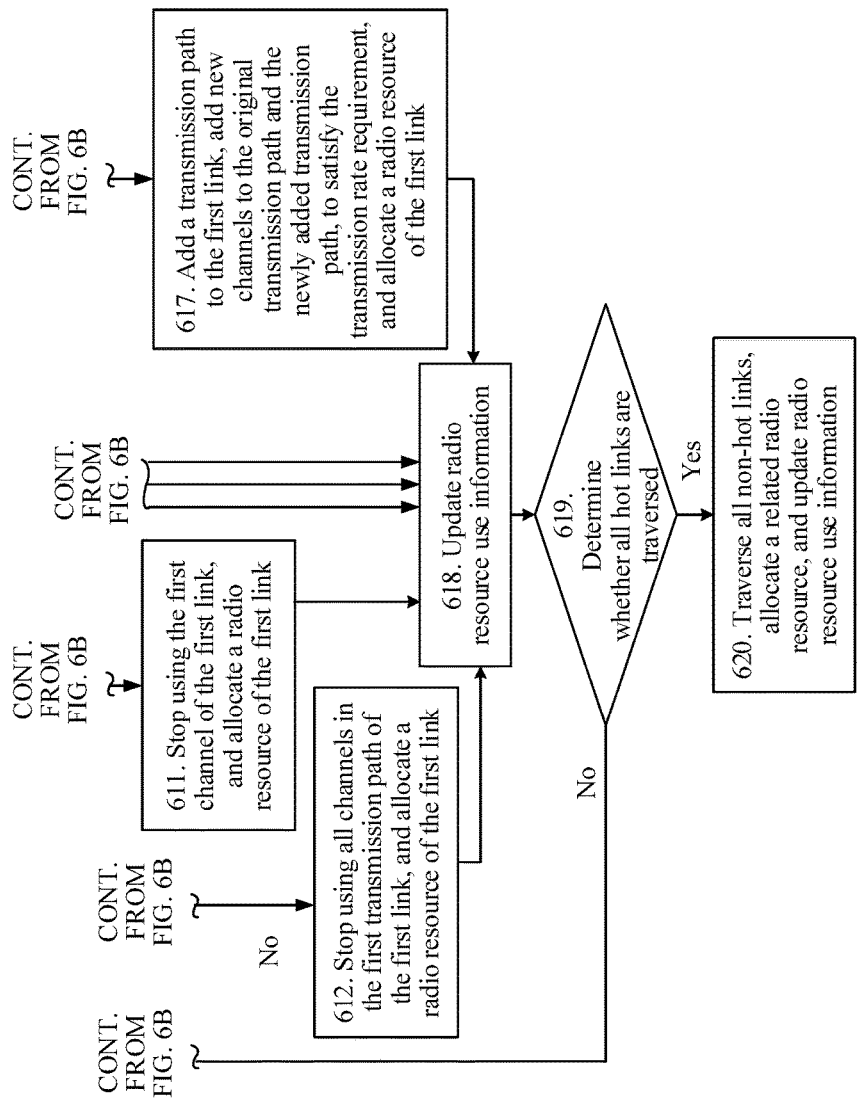

FIG. 6A, FIG. 6B, and FIG. 6C are a specific flowchart of a radio resource allocation method according to an embodiment of the present disclosure. The method shown in FIG. 6A, FIG. 6B, and FIG. 6C is applied to a data center network and is executed by a radio network controller. In a scenario shown in FIG. 6A, FIG. 6B, and FIG. 6C, the data center network may include the radio network controller and multiple WTUs. A specific procedure of the method is as follows.

Step 601: Collect historical transmission rate information of multiple links in the data center network, historical overall traffic volume information of the multiple links, and radio resource use information of each WTU.

In a specific application, step 601 may be implemented by an information collection module of the radio network controller.

It is assumed that there are m WTUs in total in a data center in the data center network, and the m WTUs may be recorded as $W_1, W_2, \ldots, W_m$.

It should be understood that a link mentioned in this embodiment of the present disclosure refers to a network transmission link between two WTUs in the data center network, and each link may include one or more transmission paths. A maximum of $$n = C_m^2 = \frac{m(m+1)}{2}$$

possible links may exist in the data center network, and the $$n = C_m^2 = \frac{m(m+1)}{2}$$

possible links may be recorded as $l_1, l_2, \ldots, l_n$.

When the historical transmission rate information of the multiple links is being collected, it is assumed that data at p time points is collected, and a transmission rate of an $i^{th}$ link at a time point j is recorded as $V_{i,j}$ (i≤n, j≤p). Time intervals between any two adjacent time points in the p time points may be the same or different. Preferably, the time intervals are the same.

When the historical overall traffic volume information is being collected, it is assumed that overall traffic volume information in k time periods is collected and recorded as $D_1, D_2, \ldots, D_k$. It should be understood that in this embodiment of the present disclosure, a start point and an end point of any time period are two time points in the p time points. Each time period may include two or more time points. In addition, any two time periods include a maximum of one same time point. Time lengths of the k time periods may be the same or different. Preferably, the time lengths of the k time periods are the same.

When the radio resource use information of each WTU is being collected, the information may be collected in the following manner.

Step 1: Collect a transmission rate of each link in each sub-direction antenna of each WTU at a current time point, where a transmission rate of a $j^{th}$ link in a $t^{th}$ sub-direction antenna of a $k^{th}$ WTU at the current time point is recorded as $V_{k,t,j}$ (k≤m).

Step 2: Collect a channel that can be added in each sub-direction of each WTU, collect a signal-to-noise ratio and bandwidth that are of each channel that can be added, and obtain, according to a Shannon's equation, a maximum transmission rate of a channel that can be added to each sub-direction antenna of each WTU.

It is assumed that a maximum transmission rate of a channel that can be added in a $t^{th}$ direction of the $k^{th}$ WTU on the $j^{th}$ link is recorded as $Rw_{k,t,j}$ (k≤m), and $$Rw_{k,t,j} = \sum_{i=1}^{s} \beta B_i \log_2(1 + SINR(i))(k \leq m).$$

β represents a ratio of a capacity to a rate, s is a quantity of channels that can be added in the $t^{th}$ direction of the $k^{th}$ WTU on the $j^{th}$ link, SINR(i) is a signal-to-noise ratio of an $i^{th}$ channel, and $B_i$ is bandwidth of the $i^{th}$ channel.

Step 3: Obtain a signal-to-noise ratio and bandwidth that are of an allocated channel of each sub-direction antenna of each WTU, obtain a maximum transmission rate of the allocated channel of each sub-direction antenna of each WTU according to the Shannon's equation, and further obtain an available transmission rate increment of the allocated channel of each sub-direction antenna of each WTU.

It is assumed that a maximum transmission rate of an allocated channel in the $t^{th}$ direction of the $k^{th}$ WTU on the $j^{th}$ link is recorded as $v_{k,t,j}$, and $$v_{k,t,j} = \sum_{i=1}^{p} \beta B_i \log_2(1 + SINR(i))(k \leq m).$$

β represents a ratio of a capacity to a rate, p is a quantity of used channels in the $t^{th}$ direction of the $k^{th}$ WTU on the $j^{th}$ link, SINR(i) is a signal-to-noise ratio of an $i^{th}$ channel, and $B_i$ is bandwidth of the $i^{th}$ channel.

A transmission rate that can be provided by an allocated channel is obtained through calculation. An available transmission rate increment of the allocated channel is obtained by subtracting an actual rate of a sub-direction antenna of a WTU from the transmission rate.

An available transmission rate increment of an allocated channel of a link, an available transmission rate increment of an original transmission path of the link, and an available transmission rate increment of an unused transmission path of the link may be determined according to an available rate increment of an allocated channel and an available rate increment of an unallocated channel in each sub-direction of a WTU in the data center network.

Step 602: Predict traffic volumes of the multiple links in a next time period.

In a specific application, step 602 may be implemented by a prediction module of the radio network controller.

Further, the radio network controller may obtain an overall traffic volume $D_{k+1}$ in the next time period through prediction according to a neural network theory, a gray system theory, or the like and according to the historical overall traffic volume data $D_1, D_2, \ldots, D_k$. For a specific prediction algorithm, refer to other approaches. Details are not described in this embodiment of the present disclosure.

Step 603: Identify a hot link in the multiple links.

In a specific application, step 603 may be implemented by a hot link determining module of the radio network controller.

Statistics collection is performed on a total rate of each link at several time points. The link is a hot link if a transmission rate of a link is greater than a value obtained by multiplying an average value by a predetermined coefficient.

In an embodiment of the present disclosure, transmission rates of four links at four time points are shown in Table 1.

TABLE 1

|        | Time point 1 | Time point 2 | Time point 3 | Time point 4 |
|--------|--------------|--------------|--------------|--------------|
| Link 1 | 1            | 2            | 3            | 1            |
| Link 2 | 2            | 3            | 3            | 1            |
| Link 3 | 2            | 2            | 2            | 3            |
| Link 4 | 8            | 10           | 12           | 15           |

It is assumed that the predetermined coefficient is 2. Only the link 4 meets the condition. That is, the link 4 is a hot link.

Generally, a transmission rate of the hot link is relatively high. Transmission performance of the data center network can be improved to some extent if a rate requirement of the hot link can be preferentially met.

Step 604: Predict a second transmission rate of the hot link at a next time point.

In a specific application, step 604 may be implemented by the prediction module of the radio network controller.

Similarly, the radio network controller may obtain a transmission rate $V_{i,p+1}$ of the $i^{th}$ link at the next time point through prediction according to the neural network theory, the gray system theory, or the like and according to historical transmission rates $V_{i,1}, V_{i,2}, \ldots, V_{i,p}$ of the $i^{th}$ link. For a specific prediction algorithm, refer to the other approaches. Details are not described in this embodiment of the present disclosure.

It should be understood that, in this embodiment of the present disclosure, the next time point for prediction is in the next time period for prediction.

It should be understood that, in this embodiment of the present disclosure, the second transmission rate refers to a transmission rate predicted and obtained using an existing prediction algorithm and that has not been modified according to an overall traffic volume.

It should be understood that, in this embodiment of the present disclosure, a branch of step 602 is in parallel with a branch of steps 603 and 604. That is, step 602 may be performed first, and then steps 603 and 604 are performed, or steps 603 and 604 are performed first, and then step 602 is performed, or step 602 and steps 603 and 604 are performed synchronously. This is not limited in this embodiment of the present disclosure.

Step 605: Modify a predicted transmission rate of the hot link to obtain a first transmission rate.

In a specific application, step 605 may be implemented by a prediction and modification module of the radio network controller.

It should be understood that, in this embodiment of the present disclosure, the first transmission rate refers to a modified predicted transmission rate.

Before a predicted transmission rate of an $i^{th}$ hot link at the next time point is modified, a second transmission rate $V_{i,p+1}$ of the $i^{th}$ hot link at the next time point and an overall traffic volume $D_{k+1}$ in the next time period need to be obtained first.

A first transmission rate $V'_{p+1}$ may be obtained according to $V_{i,p+1}$ and $D_{k+1}$.

If a transmission rate $V_{i,p+1}$ at only one time point in the next time period is predicted, one modified transmission rate $V'_{i,p+1}$ may be obtained. Certainly, if transmission rates at multiple time points in the next time period are predicted, multiple modified transmission rates may be obtained. In this case, a maximum modified transmission rate may be selected as a predicted transmission rate in the next time period, or an average value of the multiple modified transmission rates may be selected as a predicted transmission rate in the next time period.

A simple modification method is as follows:

$$V'_{i,p+1} = \frac{D_{k+1}}{D_k} V_{i,p+1}.$$

Step 606: Select a first link from a hot link that has not been processed.

After first transmission rates of all hot links are determined, the hot links may be processed one by one.

In a process of processing the hot links, the hot links may be processed according to different sequences.

For example, the hot links are selected randomly and processed one by one, or the hot links are processed one by one in descending order of magnitudes of the first transmission rates, or processed one by one in ascending order of magnitudes of the first transmission rates.

Preferably, a first link with a maximum first transmission rate may be selected from the hot link that has not been processed.

Step 607: Determine whether a predicted transmission rate of the first link increases.

It is assumed that $\Delta V = V'_{i,p+1} - V'_{i,p}$.

If $\Delta V \leq 0$, step 608 is performed, otherwise, step 613 is performed.

Step 608: Determine whether a transmission rate decrement is less than a current transmission rate of a first channel in an allocated channel in an original transmission path of the first link.

It should be understood that the first channel may be any channel in the allocated channel in the original transmission path of the first link.

Preferably, the first channel is a channel with a minimum current transmission rate in the allocated channel in the original transmission path of the first link.

It should be understood that, if the transmission rate decrement is greater than or equal to the current transmission rate of the first channel, it means that the radio network controller may release a channel resource of the first channel on at least the first link.

Preferably, if the transmission rate decrement is less than the current transmission rate of the first channel, step 609 is performed, otherwise, step 610 is performed.

Certainly, alternatively, the radio network controller may choose to perform step 609 when the transmission rate decrement is greater than or equal to the current transmission rate of the first channel. Step 608 in this embodiment of the present disclosure merely shows a preferred solution.

Step 609: Keep an existing path and an existing channel unchanged, and allocate a radio resource of the first link.

When the transmission rate decrement is less than the current transmission rate of the first channel, the existing path and the existing channel may keep unchanged, and the radio resource of the first link is allocated.

After the radio resource of the first link is allocated, step 618 is performed.

Step 610: Determine whether the transmission rate decrement is less than a current transmission rate of a first transmission path of the first link.

It should be understood that, when a transmission path includes multiple segmented paths (connected in series), a transmission rate of the transmission path is a minimum transmission rate of the segmented paths of the transmission path. FIG. 2 is used as an example. It is assumed that the first link is a network transmission link between a WTU1 and a WTU9, and WTU1→WTU5→WTU9 is a transmission path of the first link. Assuming that a transmission rate of a segmented path WTU1→WTU5 is 10 and a transmission rate of a segmented path WTU5→WTU9 is 5, a transmission rate of the transmission path WTU1→WTU5→WTU9 is 5.

Preferably, the first transmission path is a transmission path with a minimum current transmission rate in the original transmission path of the first link.

It should be understood that, if the transmission rate decrement is greater than or equal to the current transmission rate of the first transmission path, it means that the radio network controller may release a radio resource of the first transmission path on at least the first link.

Preferably, if the transmission rate decrement is less than the current transmission rate of the first transmission path, step 611 is performed, otherwise, step 612 is performed.

Certainly, alternatively, the radio network controller may choose to perform step 611 when the transmission rate decrement is greater than or equal to the current transmission rate of the first transmission path. Step 610 in this embodiment of the present disclosure merely shows a preferred solution.

Step 611: Stop using the first channel of the first link, and allocate a radio resource of the first link.

If the rate decrement is between the current transmission rate of the first channel and the current transmission rate of the first transmission path, use of the first channel may be stopped, and the radio resource of the first link is allocated.

FIG. 2 is used as an example. It is assumed that the first link is a network transmission link between a WTU1 and a WTU9, and WTU1→WTU5→WTU9 is a transmission path of the first link.

It is assumed that the first channel is a channel between the WTU1 and the WTU5. For the first link, the channel resource of the first channel may be released from radio resources of the WTU1 and the WTU5. Certainly, it should be understood that, if a second channel whose current transmission rate is less than ΔV exists between the WTU5 and the WTU9 and the second channel is used to carry data of a second link, for the first link, a channel resource of the second channel may further be released.

After the radio resource of the first link is allocated, step 618 is performed.

Step 612: Stop using all channels in the first transmission path of the first link, and allocate a radio resource of the first link.

The rate decrement is greater than or equal to the current transmission rate of the first transmission path. In this case, use of all the channels of the first transmission path may be stopped, and the radio resource of the first link is allocated.

After the radio resource of the first link is allocated, step 618 is performed.

Step 613: Determine whether an available transmission rate increment of an allocated channel in an original transmission path of the first link satisfies a transmission rate requirement.

If the available transmission rate increment of the allocated channel in the original transmission path of the first link is greater than or equal to ΔV, step 614 is performed, otherwise, step 615 is performed.

Step 614: Keep an existing path and an existing channel unchanged, and allocate a radio resource of the first link.

After the radio resource of the first link is allocated, step 618 is performed.

Step 615: Determine whether an available transmission rate increment of the original transmission path of the first link satisfies the transmission rate requirement.

If the available transmission rate increment of the original transmission path of the first link is greater than or equal to ΔV, step 616 is performed, otherwise, step 617 is performed.

It should be understood that the available transmission rate increment of the original transmission path of the first link is equal to a sum of a maximum transmission rate of a channel that can be added to the original transmission path of the first link and the available transmission rate increment of the allocated channel in the original transmission path of the first link.

Step 616: Add a new channel to the original transmission path of the first link, to satisfy the transmission rate requirement, and allocate a radio resource of the first link.

After the radio resource of the first link is allocated, step 618 is performed.

Step 617: Add a transmission path to the first link, add a new channel to original transmission path and the newly added transmission path, to satisfy the transmission rate requirement, and allocate a radio resource of the first link.

After the radio resource of the first link is allocated, step 618 is performed.

Step 618: Update radio resource use information.

After the radio resource is allocated, radio resource use information in each sub-direction of a WTU that each transmission path of the first link passes through is updated.

Step 619: Determine whether all hot links are traversed.

If all the hot links are already traversed, step 620 is performed, otherwise, step 606 is performed.

Step 620: Traverse all non-hot links, allocate a related radio resource, and update radio resource use information.

It should be understood that, for a non-hot link processing method, refer to a hot link processing method.

Generally, a transmission rate of a non-hot link is relatively low, and a traffic carrying volume is small. If an existing radio network resource cannot meet a condition of the non-hot link, an existing path and an existing channel of the non-hot link may keep unchanged.

It should be understood that the specific flowchart of the radio resource allocation method in FIG. 6A, FIG. 6B, and FIG. 6C is merely one of specific applications of the method shown in FIG. 1. In a specific application, there may be another radio resource allocation method. For example, only a hot link is adjusted to satisfy a requirement of a predicted transmission rate of the hot link, and a non-hot link is no longer adjusted, or instead of distinguishing a hot link and a non-hot link, all links are processed one by one in ascending order of magnitudes of predicted first transmission rates of all the links. In addition, when a predicted transmission rate of a link decreases, regardless of a transmission rate decrement, an existing transmission path and an existing channel of the link may keep unchanged, and a radio resource is allocated.

The following further describes application scenarios in this embodiment of the present disclosure with reference to the flowchart in FIG. 6A, FIG. 6B, and FIG. 6C.

Figure 7:
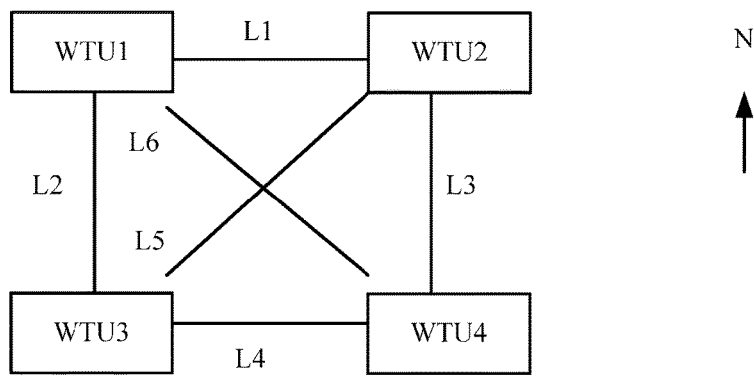
FIG. 7 is a schematic diagram of a network topology of a WTU and a link in a data center network according to an embodiment of the present disclosure.

FIG. 7 is a schematic diagram of a network topology of a WTU and a link in a data center network according to an embodiment of the present disclosure. As shown in FIG. 7, the data center network includes four WTUs (a WTU1, a WTU2, a WTU3, and a WTU4) and six links (L1, L2, L3, L4, L5, and L6) in total. An arrow points north.

Transmission rates of the six links at six time points are shown in Table 2.

TABLE 2

|    | Time point 1 | Time point 2 | Time point 3 | Time point 4 | Time point 5 | Time point 6 |
|----|---|---|---|---|---|---|
| L1 | 1  | 1  | 2  | 3  | 4  | 5  |
| L2 | 5  | 5  | 5  | 6  | 5  | 5  |
| L3 | 2  | 2  | 2  | 2  | 2  | 2  |
| L4 | 3  | 3  | 4  | 5  | 6  | 7  |
| L5 | 3  | 3  | 4  | 5  | 6  | 7  |
| L6 | 20 | 20 | 21 | 22 | 23 | 24 |

Figure 8:
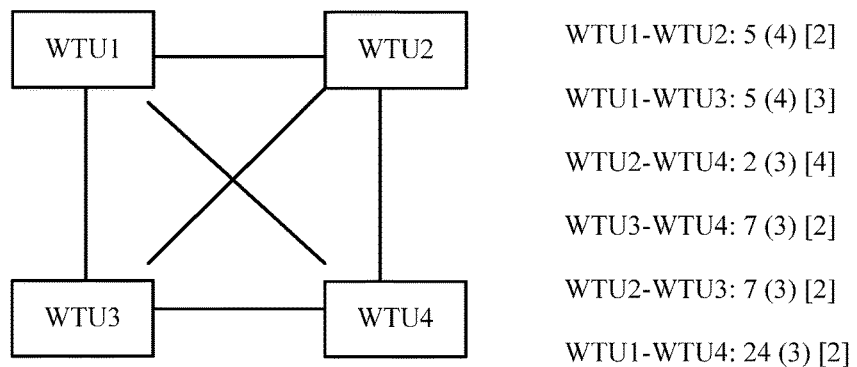
FIG. 8 is a schematic diagram of radio resource use information of a WTU in a data center network according to an embodiment of the present disclosure.

FIG. 8 is a schematic diagram of radio resource use information of a WTU in a data center network according to an embodiment of the present disclosure. It should be understood that a time point represented in the schematic diagram in FIG. 8 should be a time point at a current moment or a proximate time point preceding a current moment. If a time interval between the time point and the current moment is relatively short, radio resource use information of a WTU collected at the time point may be regarded as radio resource use information of the WTU at the current moment. Specific meanings of numbers shown on the right side in FIG. 8 are as follows. A number outside parentheses is a transmission rate of a sub-direction antenna of a WTU at the time point, a number in the parentheses is an available transmission rate increment of an allocated channel of the sub-direction antenna of the WTU at the time point, and a number in brackets is a transmission rate that can be provided by a channel that can be added to the sub-direction antenna of the WTU at the time point. Specific content is shown in Table 3. "V" indicates that there is no sub-direction antenna.

TABLE 3

|      | East    | South   | West    | North   | Southeast | Northeast | Southwest | Northwest |
|------|---------|---------|---------|---------|-----------|-----------|-----------|-----------|
| WTU1 | 5(4)[2] | 5(4)[3] | \       | \       | 24(3)[2]  | \         | \         | \         |
| WTU2 | \       | 2(3)[4] | 5(4)[2] | \       | \         | \         | 7(3)[2]   | \         |
| WTU3 | 7(3)[2] | \       | \       | 5(4)[3] | \         | 7(3)[2]   | \         | \         |
| WTU4 | \       | \       | 7(3)[2] | 2(3)[4] | \         | \         | \         | 24(3)[2]  |

In addition, when historical overall traffic volume data of a link in the data center network is collected, each time period in five time periods for collection includes two time points. A time period 1 is a time period between a time point 1 and a time point 2, a time period 2 is a time period between the time point 2 and a time point 3, a time period 3 is a time period between the time point 3 and a time point 4, a time period 4 is a time period between the time point 4 and a time point 5, and a time period 5 is a time period between the time point 5 and a time point 6. It should be understood that, in an actual application, time periods for collecting an overall traffic volume may be consecutive or nonconsecutive, time lengths of the time periods may be the same or different, and each time period includes at least two time points in Table 2.

In a specific embodiment 1 of the present disclosure, the collected historical overall traffic volume data is shown in Table 4.

TABLE 4

|                       | Time period 1 (D1) | Time period 2 (D2) | Time period 3 (D3) | Time period 4 (D4) | Time period 5 (D5) |
|-----------------------|---|---|---|---|---|
| Overall traffic volume | 50 | 54 | 53 | 51 | 56 |

Referring to FIG. 6A, FIG. 6B, and FIG. 6C, a method in the specific embodiment 1 of the present disclosure is as follows.

Step 1: Identify a hot link (step 603 in FIG. 6A).

Total rates Si of the six links L1 to L6 at the first six time points are 16, 31, 12, 28, 28, and 130 respectively.

It is assumed that a total rate of the hot link is not less than 1.5 times an average value of the total rates of all the links.

A transmission rate 130 of the link L6 is greater than $$\frac{1}{6}\sum_{i=1}^{6} S_i = 35.$$

Therefore, L6 is a hot link.

Step 2: Predict overall traffic volumes D6 of all links in a next time period (a time period 6) and a second transmission rate $V_{i,p+1}$ of the hot link L6 at a next time point (a time point 7).

In this case, $D_{k+1}$ and $V_{i,p+1}$ in step 605 in FIG. 6A are $D_6$ and $V_{7,p+1}$ respectively.

$D_6=54$ and $V_{7,p+1}=28$ may be obtained according to a prediction algorithm.

It should be understood that for specific implementation of obtaining $D_6$ and $V_{7,p+1}$ according to the prediction algorithm, refer to other approaches algorithm such as a neural network theory or a gray system theory. Details are not described in this embodiment of the present disclosure.

Step 3: Modify a predicted transmission rate of the hot link L6 at the next time point (the time point 7) according to the predicted overall traffic volumes D6, to obtain a first transmission rate $V'_{7,p+1}$ of L6.

$$V'_{7,p+1} = \frac{D_{k+1}}{D_k} V_{7,p+1} = \frac{54}{56} * 28 = 27$$

may be obtained according to a modification formula $$V'_{i,p+1} = \frac{D_{k+1}}{D_k} V_{i,p+1}.$$

Step 4: Allocate a radio resource according to the first transmission rate of L6.

A requirement for a new link rate increment of L6 is 27−24=3, and an available rate increment of an allocated channel of L6 is 3. Therefore, the requirement can be satisfied. An existing path and an existing channel keep unchanged, and the radio resource of L6 is allocated.

Step 5: Update radio resource use information.

Figure 9:
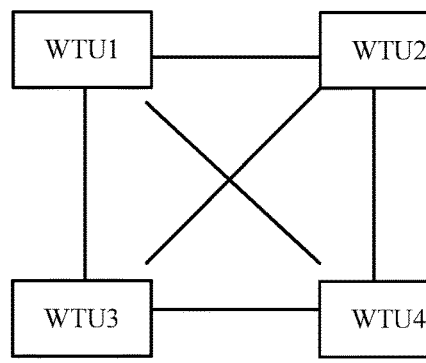
FIG. 9 is a schematic diagram of updated radio resource use information of a WTU in a data center network according to an embodiment of the present disclosure.

If a predicted transmission rate of another link does not change, only radio resource use information of L6 is updated. The updated radio resource use information is shown in FIG. 9.

In the specific embodiment 1 of the present disclosure, a method of a branch of step 614 in FIG. 6B is executed.

In a specific embodiment 2 of the present disclosure, the collected historical overall traffic volume data is shown in Table 5.

TABLE 5

|  | Time period 1 (D1) | Time period 2 (D2) | Time period 3 (D3) | Time period 4 (D4) | Time period 5 (D5) |
| --- | --- | --- | --- | --- | --- |
| Overall traffic volume | 80 | 81 | 80 | 81 | 80 |

Referring to FIG. 6A, FIG. 6B, and FIG. 6C, a method in the specific embodiment 2 of the present disclosure is as follows.

Step 1: Identify a hot link.

For a hot link identification method, refer to the specific embodiment 1 of the present disclosure.

Step 2: Predict overall traffic volumes D6 of all links in a next time period (a time period 6) and a second transmission rate $V_{i,p+1}$ of the hot link L6 at a next time point (a time point 7).

$D_6=81$ and $V_{7,p+1}=28$ may be obtained according to a prediction algorithm.

Step 3: Modify a predicted link transmission rate of the hot link L6 at the next time point (the time point 7) according to the predicted overall traffic volumes D6, to obtain a first transmission rate $V'_{i,p+1}$ of L6.

$$V'_{7,p+1} = \frac{D_{k+1}}{D_k} V_{7,p+1} = \frac{81}{80} * 28 = 28.35$$

may be obtained according to a modification formula $$V'_{i,p+1} = \frac{D_{k+1}}{D_k} V_{i,p+1}.$$

Step 4: Allocate a radio resource according to the first transmission rate of L6.

A requirement for a new link transmission rate increment of L6 is 28.35−24=4.35. An available rate increment of an allocated channel of L6 is 3, a rate that can be provided by a channel that can be added is 2, and 3+2>4.35. A channel that needs to be added can provide a rate of 4.35−3=1.35. The channel may be added to an antenna in a southeast direction of a WTU1, and the radio resource of L6 is allocated.

Step 5: Update radio resource use information.

Figure 10:
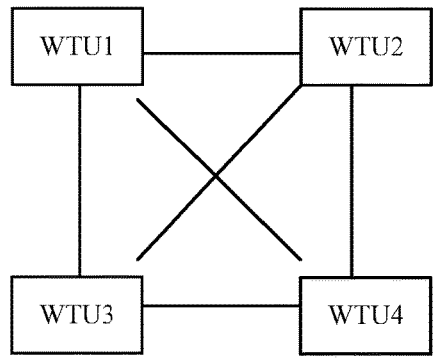
FIG. 10 is a schematic diagram of updated radio resource use information of a WTU in a data center network according to an embodiment of the present disclosure.

If a predicted transmission rate of another link does not change, only radio resource use information of L6 is updated. The updated radio resource use information is shown in FIG. 10.

In the specific embodiment 2 of the present disclosure, a method of a branch of step 616 in FIG. 6B is executed.

In a specific embodiment 3 of the present disclosure, the collected historical overall traffic volume data is shown in Table 6.

TABLE 6

|  | Time period 1 (D1) | Time period 2 (D2) | Time period 3 (D3) | Time period 4 (D4) | Time period 5 (D5) |
| --- | --- | --- | --- | --- | --- |
| Overall traffic volume | 50 | 60 | 70 | 60 | 80 |

Referring to FIG. 6A, FIG. 6B, and FIG. 6C, a method in the specific embodiment 3 of the present disclosure is as follows.

Step 1: Identify a hot link.

For a hot link identification method, refer to the embodiment 1 of the present disclosure.

Step 2: Predict overall traffic volumes D6 of all links in a next time period (a time period 6) and a second transmission rate $V_{i,p+1}$ of the hot link L6 at a next time point (a time point 7).

$D_6=90$ and $V_{7,p+1}=28$ may be obtained according to a prediction algorithm.

Step 3: Modify a predicted link transmission rate of the hot link L6 at the next time point (the time point 7) according to the predicted overall traffic volumes D6, to obtain a first transmission rate $V'_{7,p+1}$ of L6.

$$V'_{7,p+1} = \frac{D_{k+1}}{D_k} V_{7,p+1} = \frac{90}{80} * 28 = 31.5$$

may be obtained according to a modification formula $$V'_{i,p+1} = \frac{D_{k+1}}{D_k} V_{i,p+1}.$$

Step 4: Allocate a radio resource according to the first transmission rate of L6.

A requirement for a new link transmission rate increment of L6 is 31.5−24=7.5. An available rate increment of an allocated channel of L6 is 3, a rate that can be provided by a channel that can be added is 2, and 3+2<7.5. In this case, a resource with a transmission rate of 2.5 needs to be obtained from another transmission path of the link L6. It can be learned from FIG. 8 that both paths WTU1→WTU2→WTU4 and WTU1→WTU3→WTU4 can provide the transmission rate of 2.5. If another transmission path that is already used exists in L6, this type of transmission path is preferentially used. Otherwise, an unused transmission path in L6 is selected. It is assumed that the transmission path selected in L6 is WTU1→WTU2→WTU4. In this case, a resource with a transmission rate of 5 may be added for L6 in a path WTU1→WTU4, and a resource with a transmission rate of 2.5 may be added for L6 in the path WTU1→WTU2→WTU4.

Step 5: Update radio resource use information.

Figure 11:
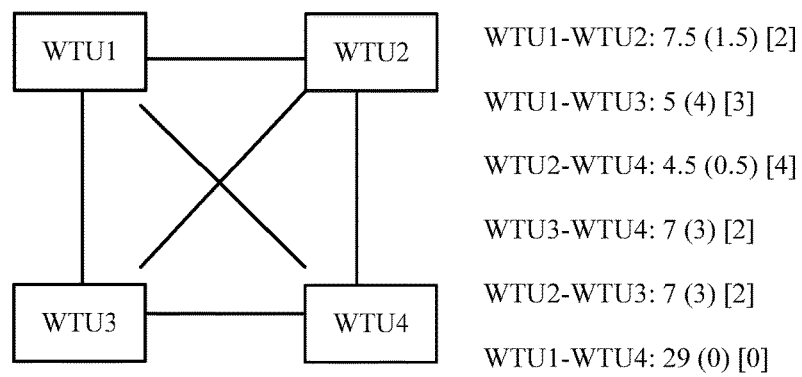
FIG. 11 is a schematic diagram of updated radio resource use information of a WTU in a data center network according to an embodiment of the present disclosure.

The updated radio resource use information is shown in FIG. 11 if a predicted link transmission rate of another link does not change.

In the specific embodiment 3 of the present disclosure, a method of a branch of step 617 in FIG. 6C is executed.

In a specific embodiment 4 of the present disclosure, the collected historical overall traffic volume data is shown in Table 7.

TABLE 7

|  | Time period 1 (D1) | Time period 2 (D2) | Time period 3 (D3) | Time period 4 (D4) | Time period 5 (D5) |
|---|---|---|---|---|---|
| Overall traffic volume | 80 | 75 | 70 | 60 | 50 |

Referring to FIG. 6A, FIG. 6B, and FIG. 6C, a method in the specific embodiment 4 of the present disclosure is as follows.

Step 1: Identify a hot link.

For a hot link identification method, refer to the embodiment 1 of the present disclosure.

Step 2: Predict overall traffic volumes D6 of all links in a next time period (a time period 6) and a second transmission rate $V_{i,p+1}$ of the hot link L6 at a next time point (a time point 7).

$D_6=40$ and $V_{i,p+1}=28$ may be obtained according to a prediction algorithm.

Step 3: Modify a predicted link transmission rate of the hot link L6 at the next time point (the time point 7) according to the predicted overall traffic volumes D6, to obtain a first transmission rate $V'_{7,p+1}$ of L6.

$$V'_{7,p+1} = \frac{D_{k+1}}{D_k} V_{7,p+1} = \frac{40}{50} * 28 = 22.4$$

may be obtained according to a modification formula $$V'_{i,p+1} = \frac{D_{k+1}}{D_k} V_{i,p+1}.$$

Step 4: Allocate a radio resource according to the first transmission rate of L6.

A link rate decrement of L6 is 24−22.4=1.6. Antennas and channels used in the southeast direction of the WTU1 and in the northwest direction of the WTU4 are not reduced if a rate that can be provided by each channel used in a southeast direction of a WTU1 and in a northwest direction of a WTU4 is greater than 1.6. The channel is not used in the southeast direction of the WTU1 and in the northwest direction of the WTU4 if a rate that can be provided by a channel used in a southeast direction of a WTU1 and in a northwest direction of a WTU4 is less than 1.6. Further, the antenna is disabled if the channel is not used and no other channels exist on an antenna for transmitting the channel.

Step 5: Update radio resource use information.

The radio resource use information is updated according to a radio resource allocation status of L6.

Figure 12:
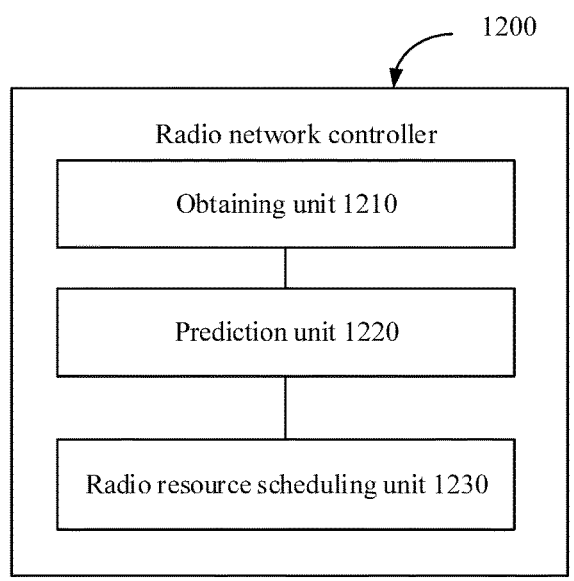
FIG. 12 is a schematic structural diagram of a radio network controller according to an embodiment of the present disclosure.

FIG. 12 is a schematic structural diagram of a radio network controller 1200 according to an embodiment of the present disclosure. The radio network controller 1200 is located in a data center network, and the data center network includes multiple WTUs. As shown in FIG. 12, the radio network controller 1200 may include an obtaining unit 1210, a prediction unit 1220, and a radio resource scheduling unit 1230.

The obtaining unit 1210 is configured to obtain transmission rate information of multiple links in the data center network at time points t1, t2, . . . , and tn, overall traffic volume information of the multiple links in time periods T1, T2, . . . , and Tm, and radio resource use information of each WTU in the multiple WTUs.

Each link in the multiple links is a transmission link between two WTUs in the multiple WTUs, each time period in the time periods T1, T2, . . . , and Tm includes at least two time points in the time points t1, t2, . . . , and tn, and any two time periods in the time periods T1, T2, . . . , and Tm do not overlap in time.

It should be understood that, that any two time periods in the time periods T1, T2, . . . , and Tm do not overlap in time means that no common time period intersection set exists in time between the any two time periods in the time periods T1, T2, . . . , and Tm. It should be specially noted that when in two time periods, an end point of a first time period is a start point of a second time period also belongs to when the two time periods do not overlap.

The prediction unit 1220 is configured to predict a first transmission rate of a first link at a time point tn+1 in a time period Tm+1 according to the transmission rate information of the multiple links at the time points t1, t2, . . . , and tn and the overall traffic volume information of the multiple links in the time periods T1, T2, . . . , and Tm.

The first link is one of the multiple links, a time period Tj+1 is a time period following a time period Tj, a time point ti+1 is a time point following a time point ti, i and j are integers, 1≤i≤n, and 1≤j≤m.

The radio resource scheduling unit 1230 is configured to determine a path that can satisfy a transmission rate requirement of the first link, and allocate a radio resource of the first link, according to the first transmission rate of the first link at the time point tn+1 and the radio resource use information of each WTU in the multiple WTUs.

It should be understood that a radio resource of a link includes an antenna resource in each sub-direction of a WTU and a channel resource of each sub-direction antenna. A sub-direction antenna of the WTU may include one or more antennas.

In this embodiment of the present disclosure, the radio network controller 1200 predicts a transmission rate of a link at at least one future time point, determines a selection path of the link, and allocates a radio resource of the link, according to historical overall traffic volume information and historical rate information of multiple links in a data center network and radio resource use information of each WTU, such that path selection and radio resource allocation can be performed on a link before congestion occurs, thereby improving resource use efficiency and radio network performance.

Optionally, a start time point and an end time point of each time period in the time periods T1, T2, . . . , and Tm are two time points in the time points t1, t2, . . . , and tn.

Figure 13:
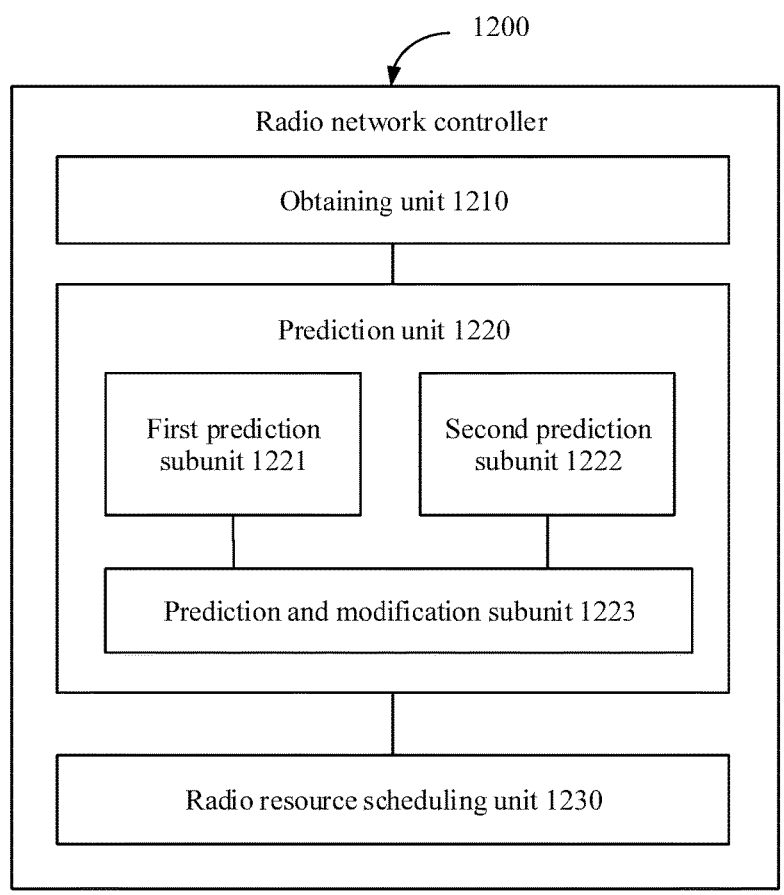
FIG. 13 is another schematic structural diagram of a radio network controller according to an embodiment of the present disclosure.

FIG. 13 is another schematic structural diagram of a radio network controller 1200 according to an embodiment of the present disclosure. Optionally, in an embodiment, as shown in FIG. 13, the prediction unit 1220 may include a first prediction subunit 1221, a second prediction subunit 1222, and a prediction and modification subunit 1223.

The first prediction subunit 1221 is configured to predict a second transmission rate of the first link at the time point tn+1 according to the transmission rate information of the multiple links at the time points t1, t2, . . . , and tn.

The second prediction subunit 1222 is configured to predict overall traffic volume information of the multiple links in the time period Tm+1 according to the overall traffic volume information of the multiple links in the time periods T1, T2, . . . , and Tm.

The prediction and modification subunit 1223 is configured to modify the second transmission rate of the first link at the time point tn+1 according to the overall traffic volume information of the multiple links in the time periods T1, T2, ..., Tm, and Tm+1, to obtain the first transmission rate of the first link at the time point tn+1.

An overall traffic volume of a first link in a future time period is predicted according to overall traffic volumes of the first link in multiple time periods, a transmission rate of the first link at a future time point in the future time period is predicted according to transmission rates of the first link at multiple time points, and then the transmission rate at the future time point is modified according to the overall traffic volume of the first link in the future time period, such that a relatively accurate predicted value of the transmission rate at the future time point can be obtained.

It should be understood that, according to this embodiment of the present disclosure, the transmission rates at the multiple time points in the future time period may be predicted. In a specific application, a maximum transmission rate value in the transmission rates may be selected as a parameter for determining a path of the first link.

Figure 14:
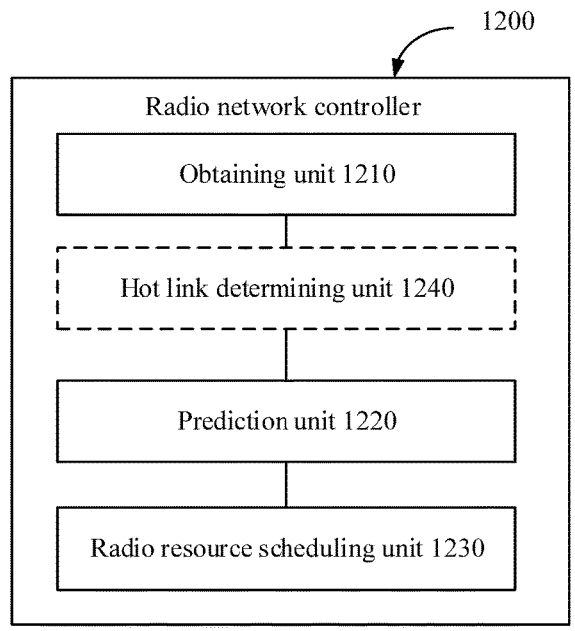
FIG. 14 is another schematic structural diagram of a radio network controller according to an embodiment of the present disclosure.

FIG. 14 is another schematic structural diagram of a radio network controller 1200 according to an embodiment of the present disclosure. Optionally, in an embodiment, the radio network controller 1200 may further include a hot link determining unit 1240. The hot link determining unit 1240 is configured to determine the first link according to the transmission rate information of the multiple links at the time points t1, t2, ..., and tn. The first link is a hot link in the multiple links, a total transmission rate of the hot link at the time points t1, t2, ..., and tn is greater than a value obtained by multiplying an average transmission rate of the multiple links at the time points t1, t2, ..., and tn by a predetermined coefficient, and the average transmission rate is an average value of total transmission rates of the multiple links at the time points t1, t2, ..., and tn.

It should be understood that a radio resource requirement of a hot service can be fully satisfied by preferentially processing a hot link, thereby improving service performance of a data center network.

Optionally, in an embodiment, the radio resource use information of each WTU includes a current transmission rate of each sub-direction antenna of the WTU, a current transmission rate of an allocated channel of each sub-direction antenna of the WTU, an available transmission rate increment of the allocated channel of each sub-direction antenna of the WTU, and an available transmission rate increment of a channel, which can be allocated but is not actually allocated, of each sub-direction antenna of the WTU. The obtaining unit 1210 may be further configured to obtain a current transmission rate of each sub-direction antenna of each WTU in the multiple WTUs, obtain a current transmission rate of an allocated channel of each sub-direction antenna of each WTU in the multiple WTUs, obtain signal-to-noise ratios and bandwidth that are of the allocated channel and an unallocated channel of each sub-direction antenna of each WTU in the multiple WTUs, and obtain an available transmission rate increment of the unallocated channel of each sub-direction antenna of each WTU in the multiple WTUs according to the signal-to-noise ratio and the bandwidth that are of the unallocated channel of each sub-direction antenna of each WTU in the multiple WTUs, obtain an available transmission rate increment of the allocated channel of each sub-direction antenna of each WTU in the multiple WTUs according to the signal-to-noise ratio and the bandwidth that are of the allocated channel of each sub-direction antenna of each WTU in the multiple WTUs and the current transmission rate of the allocated channel of each sub-direction antenna of each WTU in the multiple WTUs, and obtain an available transmission rate increment of each sub-direction antenna of each WTU in the multiple WTUs according to the available transmission rate increment of the unallocated channel of each sub-direction antenna of each WTU in the multiple WTUs and the available transmission rate increment of the allocated channel of each sub-direction antenna of each WTU in the multiple WTUs.

Optionally, the obtaining unit 1210 is further configured to obtain an available transmission rate increment of an allocated channel in an original transmission path of the first link, an available transmission rate increment of the original transmission path of the first link, and an available transmission rate increment of an unused transmission path of the first link according to the available transmission rate increment of each sub-direction antenna of each WTU in the multiple WTUs.

Optionally, in an embodiment, the radio resource scheduling unit 1230 is further configured to keep the original transmission path and a channel of the first link unchanged, and allocate the radio resource of the first link if V>V1 and V≤V1+V2. V is the first transmission rate, V1 is a sum of current transmission rates of all original transmission paths of the first link, and V2 is a sum of available transmission rate increments of allocated channels in all the original transmission paths of the first link.

Optionally, in another embodiment, the radio resource scheduling unit 1230 is further configured to keep the original transmission path of the first link unchanged, add a new channel resource to the original transmission path of the first link according to the available transmission rate increment of the allocated channel in the original transmission path of the first link and the available transmission rate increment of the original transmission path of the first link, until all transmission paths of the first link can satisfy a rate requirement of the first transmission rate, and allocate the radio resource of the first link if V>V1+V2 and V≤V1+V3. V is the first transmission rate, V1 is a sum of current transmission rates of all original transmission paths of the first link, V2 is a sum of available transmission rate increments of allocated channels in all the original transmission paths of the first link, and V3 is an available transmission rate increment of a first transmission path of the first link.

Optionally, in another embodiment, the radio resource scheduling unit 1230 is further configured to add a new transmission path to the first link according to the available transmission rate increment of the allocated channel in the original transmission path of the first link, the available transmission rate increment of the original transmission path of the first link, and the available transmission rate increment of the unused transmission path of the first link, add new channel resources to the original transmission path and the new transmission path of the first link, until all transmission paths of the first link can satisfy a rate requirement of the first transmission rate, and allocate the radio resource of the first link if V>V1+V3. V is the first transmission rate, V1 is a sum of current transmission rates of all original transmission paths of the first link, and V3 is an available transmission rate increment of a first transmission path of the first link.

Optionally, in another embodiment, the radio resource scheduling unit 1230 is further configured to keep the original transmission path and a channel of the first link unchanged, and allocate the radio resource of the first link if V1−V≥0 and V1−V<V4. V is the first transmission rate, V1 is a sum of current transmission rates of all original transmission paths of the first link, and V4 is a current transmission rate of a first channel in allocated channels in all transmission paths of the first link.

Optionally, in another embodiment, the radio resource scheduling unit 1230 is further configured to stop using a first channel in an allocated channel of the first link, and allocate the radio resource of the first link if V1−V≥V4 and V1−V<V5. V is the first transmission rate, V1 is a sum of current transmission rates of all original transmission paths of the first link, V4 is a current transmission rate of a first channel in allocated channels in all transmission paths of the first link, and V5 is a current transmission rate of a first transmission path of the first link.

Optionally, in another embodiment, the radio resource scheduling unit 1230 is further configured to stop using all channels in a first transmission path of the first link, and allocate the radio resource of the first link if V1−V≥V5. V is the first transmission rate, V1 is a sum of current transmission rates of all original transmission paths of the first link, and V5 is a current transmission rate of the first transmission path of the first link.

Further, the radio resource scheduling unit 1230 is further configured to disable the first antenna if a first antenna that does not transmit or receive any channel exists in a first sub-direction antenna of a first WTU of the first link. It should be understood that the first WTU of the first link refers to a WTU that a transmission path of the first link passes through.

Optionally, the radio resource scheduling unit 1230 is further configured to update radio resource use information of a WTU related to the first link after the path that can satisfy the transmission rate requirement of the first link is determined and the radio resource of the first link is allocated.

Preferably, time intervals between any two adjacent time points in the time points t1, t2, . . . , and to are equal.

Preferably, time lengths of the time periods T1, T2, . . . , and Tm are equal.

In addition, the radio network controller 1200 may further execute the method in FIG. 1 and can implement functions of a radio network controller in the foregoing embodiments shown in FIG. 1, FIG. 6A, FIG. 6B, and FIG. 6C and the specific embodiments 1 to 4 of the present disclosure. Details are not described repeatedly in this embodiment of the present disclosure.

Figure 15:
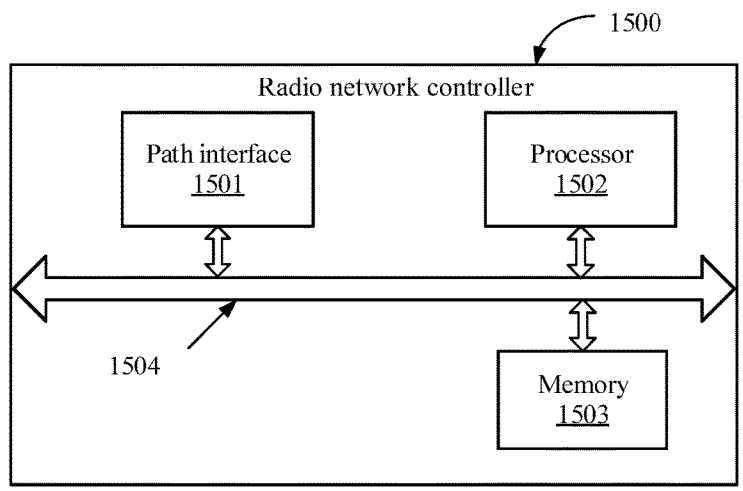
FIG. 15 is another schematic structural diagram of a radio network controller according to an embodiment of the present disclosure.

FIG. 15 is a schematic structural diagram of a radio network controller 1500 according to an embodiment of the present disclosure. The radio network controller 1500 may include a processor 1502, a memory 1503, and a path interface 1501. In this embodiment of the present disclosure, the radio network controller 1500 is located in a data center network, and the data center network includes multiple WTUs.

The path interface 1501, the processor 1502, and the memory 1503 are connected to each other using a bus 1504. The bus 1504 may be an Industry Standard Architecture (ISA) bus, a Peripheral Component Interconnect (PCI) bus, an Extended ISA (EISA) bus, or the like. The bus 1504 may be classified into an address bus, a data bus, a control bus, and the like. For ease of denotation, in FIG. 15, the bus 1504 is indicated using only one double-headed arrow. However, it does not indicate that there is only one bus or only one type of bus. In a specific application, the path interface 1501 may perform information interaction with an external device using a wired network or a wireless network.

The memory 1503 is configured to store a program. Further, the program may include program code, and the program code includes a computer operation instruction. The memory 1503 may include a read-only memory (ROM) and a random access memory (RAM), and provides an instruction and data to the processor 1502. The memory 1503 may include a high-speed RAM, and may further include a non-volatile memory, for example, at least one magnetic disk memory.

The processor 1502 executes the program stored by the memory 1503 and is further configured to perform the following operations. Obtaining transmission rate information of multiple links in the data center network at time points t1, t2, . . . , and tn, overall traffic volume information of the multiple links in time periods T1, T2, . . . , and Tm, and radio resource use information of each WTU in the multiple WTUs in the data center network using the path interface 1501, where each link in the multiple links is a transmission link between two WTUs in the multiple WTUs, each time period in the time periods T1, T2, . . . , and Tm includes at least two time points in the time points t1, t2, . . . , and tn, and any two time periods in the time periods T1, T2, . . . , and Tm do not overlap in time, predicting a first transmission rate of a first link at a time point tn+1 in a time period Tm+1 according to the transmission rate information of the multiple links at the time points t1, t2, . . . , and tn and the overall traffic volume information of the multiple links in the time periods T1, T2, . . . , and Tm, where the first link is one of the multiple links, a time period Tj+1 is a time period following a time period Tj, a time point ti+1 is a time point following a time point ti, i and j are integers, 1≤i≤n, and 1≤j≤m, and determining a path that can satisfy a transmission rate requirement of the first link, and allocating a radio resource of the first link, according to the first transmission rate of the first link at the time point tn+1 and the radio resource use information of each WTU in the multiple WTUs.

It should be understood that, that any two time periods in the time periods T1, T2, . . . , and Tm do not overlap in time means that no common time period intersection set exists in time between the any two time periods in the time periods T1, T2, . . . , and Tm. It should be specially noted that when in two time periods, an end point of a first time period is a start point of a second time period also belongs to when the two time periods do not overlap.

It should be understood that a radio resource of a link includes an antenna resource in each sub-direction of a WTU and a channel resource of each sub-direction antenna. A sub-direction antenna of the WTU may include one or more antennas.

The foregoing method executed by the radio network controller 1500 and disclosed in any embodiment in FIG. 1, FIG. 6A, FIG. 6B, and FIG. 6C of the present disclosure may be applied to the processor 1502, or may be implemented by the processor 1502. The processor 1502 may be an integrated circuit chip and has a signal processing capability. In an implementation process, steps of the foregoing method may be implemented using an integrated logical circuit of hardware in the processor 1502 or an instruction in a form of software. The foregoing processor 1502 may be a general purpose processor, including a central processing unit (CPU), a network processor (NP), and the like, or may be a digital signal processor (DSP), an application-specific integrated circuit (ASIC), a field programmable gate array (FPGA), another programmable logical device, a discrete gate or transistor logic device, or a discrete hardware component. The processor 1502 may implement or execute all methods, steps, and logical block diagrams disclosed in the embodiments of the present disclosure. The general purpose processor may be a microprocessor, or the processor 1502 may be any conventional processor or the like. Steps of the methods disclosed with reference to the embodiments of the present disclosure may be directly implemented using a hardware decoding processor, or may be implemented using a combination of hardware and software modules in a decoding processor. The software module may be located in a mature storage medium in the field such as a RAM, a flash memory, a ROM, a programmable ROM (PROM), an electrically erasable programmable memory, or a register. The storage medium is located in the memory 1503. The processor 1502 reads information in the memory 1503 and implements the steps of the foregoing method with reference to hardware of the processor 1502.

Optionally, a start time point and an end time point of each time period in the time periods T1, T2, . . . , and Tm are two time points in the time points t1, t2, . . . , and tn.

Optionally, in a process of predicting the first transmission rate of the first link at the time point tn+1 in the time period Tm+1 according to the transmission rate information of the multiple links at the time points t1, t2, . . . , and tn and the overall traffic volume information of the multiple links in the time periods T1, T2, . . . , and Tm, the processor 1502 is further configured to predict a second transmission rate of the first link at the time point tn+1 according to the transmission rate information of the multiple links at the time points t1, t2, . . . , and tn, predict overall traffic volume information of the multiple links in the time period Tm+1 according to the overall traffic volume information of the multiple links in the time periods T1, T2, . . . , and Tm, and modify the second transmission rate of the first link at the time point tn+1 according to the overall traffic volume information of the multiple links in the time periods T1, T2, . . . , Tm, and Tm+1, to obtain the first transmission rate of the first link at the time point tn+1.

An overall traffic volume of a first link in a future time period is predicted according to overall traffic volumes of the first link in multiple time periods, a transmission rate of the first link at a future time point in the future time period is predicted according to transmission rates of the first link at multiple time points, and then the transmission rate at the future time point is modified according to the overall traffic volume of the first link in the future time period, such that a relatively accurate predicted value of the transmission rate at the future time point can be obtained.

It should be understood that, according to the method in this embodiment of the present disclosure, the transmission rates at the multiple time points in the future time period may be predicted. In a specific application, a maximum transmission rate value in the transmission rates may be selected as a parameter for determining a path of the first link.

Optionally, the processor 1502 is further configured to modify a third transmission rate of a second link at the time point tn+1 according to the overall traffic volume information of the multiple links in the time periods T1, T2, . . . , Tm, and Tm+1, to obtain a fourth transmission rate of the second link at the time point tn+1, where the second link is a link in the multiple links except the first link, and determine a path that can satisfy a transmission rate requirement of the second link, and allocate a radio resource of the second link, according to the fourth transmission rate of the second link at the time point tn+1 and the radio resource use information of each WTU in the multiple WTUs.

Optionally, the processor 1502 is further configured to determine the first link according to the transmission rate information of the multiple links at the time points t1, t2, . . . , and tn, where the first link is a hot link in the multiple links, a total transmission rate of the hot link at the time points t1, t2, . . . , and tn is greater than a value obtained by multiplying an average transmission rate of the multiple links at the time points t1, t2, . . . , and tn by a predetermined coefficient, and the average transmission rate is an average value of total transmission rates of the multiple links at the time points t1, t2, . . . , and tn.

It should be understood that a radio resource requirement of a hot service can be fully satisfied by preferentially processing a hot link, thereby improving service performance of a data center network.

Optionally, the radio resource use information of each WTU includes a current transmission rate of each sub-direction antenna of the WTU, a current transmission rate of an allocated channel of each sub-direction antenna of the WTU, an available transmission rate increment of the allocated channel of each sub-direction antenna of the WTU, and an available transmission rate increment of a channel, which can be allocated but is not actually allocated, of each sub-direction antenna of the WTU. In a process of obtaining the radio resource use information of each WTU, the processor 1502 is further configured to obtain a current transmission rate of each sub-direction antenna of each WTU in the multiple WTUs, obtain a current transmission rate of an allocated channel of each sub-direction antenna of each WTU in the multiple WTUs, obtain signal-to-noise ratios and bandwidth that are of the allocated channel and an unallocated channel of each sub-direction antenna of each WTU in the multiple WTUs, and obtain an available transmission rate increment of the unallocated channel of each sub-direction antenna of each WTU in the multiple WTUs according to the signal-to-noise ratio and the bandwidth that are of the unallocated channel of each sub-direction antenna of each WTU in the multiple WTUs, obtain an available transmission rate increment of the allocated channel of each sub-direction antenna of each WTU in the multiple WTUs according to the signal-to-noise ratio and the bandwidth that are of the allocated channel of each sub-direction antenna of each WTU in the multiple WTUs and the current transmission rate of the allocated channel of each sub-direction antenna of each WTU in the multiple WTUs, and obtain an available transmission rate increment of each sub-direction antenna of each WTU in the multiple WTUs according to the available transmission rate increment of the unallocated channel of each sub-direction antenna of each WTU in the multiple WTUs and the available transmission rate increment of the allocated channel of each sub-direction antenna of each WTU in the multiple WTUs.

Optionally, the processor 1502 is further configured to obtain an available transmission rate increment of an allocated channel in an original transmission path of the first link, an available transmission rate increment of the original transmission path of the first link, and an available transmission rate increment of an unused transmission path of the first link according to the available transmission rate increment of each sub-direction antenna of each WTU in the multiple WTUs.

Optionally, in an embodiment, in a process of determining the path that can satisfy the transmission rate requirement of the first link, and allocating the radio resource of the first link, according to the first transmission rate of the first link at the time point tn+1 and the radio resource use information of each WTU in the multiple WTUs, the processor 1502 is further configured to keep the original transmission path and a channel of the first link unchanged, and allocate the radio resource of the first link if V>V1 and V≤V1+V2. V is the first transmission rate, V1 is a sum of current transmission rates of all original transmission paths of the first link, and V2 is a sum of available transmission rate increments of allocated channels in all the original transmission paths of the first link.

Optionally, in another embodiment, in a process of determining the path that can satisfy the transmission rate requirement of the first link, and allocating the radio resource of the first link, according to the first transmission rate of the first link at the time point tn+1 and the radio resource use information of each WTU in the multiple WTUs, the processor 1502 is further configured to keep the original transmission path of the first link unchanged, add a new channel resource to the original transmission path of the first link according to the available transmission rate increment of the allocated channel in the original transmission path of the first link and the available transmission rate increment of the original transmission path of the first link, until all transmission paths of the first link can satisfy a rate requirement of the first transmission rate, and allocate the radio resource of the first link if $V>V1+V2$ and $V\leq V1+V3$. V is the first transmission rate, V1 is a sum of current transmission rates of all original transmission paths of the first link, V2 is a sum of available transmission rate increments of allocated channels in all the original transmission paths of the first link, and V3 is an available transmission rate increment of a first transmission path of the first link.

Optionally, in another embodiment, in a process of determining the path that can satisfy the transmission rate requirement of the first link, and allocating the radio resource of the first link, according to the first transmission rate of the first link at the time point tn+1 and the radio resource use information of each WTU in the multiple WTUs, the processor 1502 is further configured to add a new transmission path to the first link according to the available transmission rate increment of the allocated channel in the original transmission path of the first link, the available transmission rate increment of the original transmission path of the first link, and the available transmission rate increment of the unused transmission path of the first link, add new channel resources to the original transmission path and the new transmission path of the first link, until all transmission paths of the first link can satisfy a rate requirement of the first transmission rate, and allocate the radio resource of the first link if $V>V1+V3$. V is the first transmission rate, V1 is a sum of current transmission rates of all original transmission paths of the first link, and V3 is an available transmission rate increment of a first transmission path of the first link.

Optionally, in another embodiment, in a process of determining the path that can satisfy the transmission rate requirement of the first link, and allocating the radio resource of the first link, according to the first transmission rate of the first link at the time point tn+1 and the radio resource use information of each WTU in the multiple WTUs, the processor 1502 is further configured to keep the original transmission path and a channel of the first link unchanged, and allocate the radio resource of the first link if $V1-V\geq 0$ and $V1-V<V4$. V is the first transmission rate, V1 is a sum of current transmission rates of all original transmission paths of the first link, and V4 is a current transmission rate of a first channel in allocated channels in all transmission paths of the first link.

Optionally, in another embodiment, in a process of determining the path that can satisfy the transmission rate requirement of the first link, and allocating the radio resource of the first link, according to the first transmission rate of the first link at the time point tn+1 and the radio resource use information of each WTU in the multiple WTUs, the processor 1502 is further configured to stop using a first channel in an allocated channel of the first link, and allocate the radio resource of the first link if $V1-V\geq V4$ and $V1-V<V5$. V is the first transmission rate, V1 is a sum of current transmission rates of all original transmission paths of the first link, V4 is a current transmission rate of a first channel in allocated channels in all transmission paths of the first link, and V5 is a current transmission rate of a first transmission path of the first link.

Optionally, in another embodiment, in a process of determining the path that can satisfy the transmission rate requirement of the first link, and allocating the radio resource of the first link, according to the first transmission rate of the first link at the time point tn+1 and the radio resource use information of each WTU in the multiple WTUs, the processor 1502 is further configured to stop using all channels in a first transmission path of the first link, and allocate the radio resource of the first link if $V1-V\geq V5$. V is the first transmission rate, V1 is a sum of current transmission rates of all original transmission paths of the first link, and V5 is a current transmission rate of the first transmission path of the first link.

The processor 1502 is further configured to disable the first antenna if a first antenna that does not transmit or receive any channel exists in a first sub-direction antenna of a first WTU of the first link. It should be understood that the first WTU of the first link refers to a WTU that a transmission path of the first link passes through.

Optionally, the processor 1502 is further configured to update radio resource use information of a WTU related to the first link after the path that can satisfy the transmission rate requirement of the first link is determined and the radio resource of the first link is allocated.

Preferably, time intervals between any two adjacent time points in the time points t1, t2, . . . , and to are equal.

Preferably, time lengths of the time periods T1, T2, . . . , and Tm are equal.

In addition, the radio network controller 1500 may further execute the method in FIG. 1 and can implement functions of a radio network controller in the foregoing embodiments shown in FIG. 1, FIG. 6A, FIG. 6B, and FIG. 6C and the specific embodiments 1 to 4 of the present disclosure. Details are not described repeatedly in this embodiment of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein repeatedly.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

The functions may be stored in a computer-readable storage medium when the functions are implemented in the form of a software functional unit and sold or used as an independent product. Based on such an understanding, the technical solutions of the present disclosure essentially, or the part contributing to the prior art, or some of the technical solutions may be implemented in a form of a software product. The software product is stored in a storage medium, and includes several instructions for instructing a computer device, which may be a personal computer, a server, or a network device to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A radio resource allocation method, applied to a data center network, wherein the data center network comprises a plurality of wireless transmitters, and wherein the method comprises:
   obtaining transmission rate information of a plurality of links in the data center network at time points t1, t2, . . . , and tn, overall traffic volume information of the plurality of links in time periods T1, T2, . . . , and Tm, and radio resource use information of each wireless transmitter in the plurality of wireless transmitters, wherein each link in the plurality of links is a transmission link between two wireless transmitters in the plurality of wireless transmitters, wherein each time period in the time periods T1, T2, . . . , and Tm comprises at least two time points in the time points t1, t2, . . . , and tn, and wherein any two time periods in the time periods T1, T2, . . . , and Tm do not overlap in time;
   predicting a first transmission rate of a first link at a time point tn+1 in a time period Tm+1 according to the transmission rate information of the plurality of links at the time points t1, t2, . . . , and tn and the overall traffic volume information of the plurality of links in the time periods T1, T2, . . . , and Tm, wherein the first link is one of the plurality of links, wherein a time period Tj+1 is a time period following a time period Tj, wherein a time point ti+1 is a time point following a time point ti, wherein i and j are integers, wherein 1≤i≤n, and wherein 1≤j≤m;
   determining a path that can satisfy a transmission rate requirement of the first link; and
   allocating a radio resource of the first link, according to the first transmission rate of the first link at the time point tn+1 and the radio resource use information of each wireless transmitter in the plurality of wireless transmitters.

2. The method according to claim 1, wherein predicting the first transmission rate of the first link comprises:
   predicting a second transmission rate of the first link at the time point tn+1 according to the transmission rate information of the plurality of links at the time points t1, t2, . . . , and tn;
   predicting overall traffic volume information of the plurality of links in the time period Tm+1 according to the overall traffic volume information of the plurality of links in the time periods T1, T2, . . . , and Tm; and
   modifying the second transmission rate of the first link at the time point tn+1 according to the overall traffic volume information of the plurality of links in the time periods T1, T2, . . . , Tm, and Tm+1 in order to obtain the first transmission rate of the first link at the time point tn+1.

3. The method according to claim 1, wherein before predicting the first transmission rate of the first link, the method further comprises determining the first link according to the transmission rate information of the plurality of links at the time points t1, t2, . . . , and tn, wherein the first link is a hot link in the plurality of links, wherein a total transmission rate of the hot link at the time points t1, t2, . . . , and tn is greater than a value obtained by multiplying an average transmission rate of the plurality of links at the time points t1, t2, . . . , and tn by a predetermined coefficient, and wherein the average transmission rate is an average value of total transmission rates of the plurality of links at the time points t1, t2, . . . , and tn.

4. The method according to claim 1, wherein after allocating the radio resource of the first link, the method further comprises:
   modifying a third transmission rate of a second link at the time point tn+1 according to the overall traffic volume information of the plurality of links in the time periods T1, T2, . . . , Tm, and Tm+1 in order to obtain a fourth transmission rate of the second link at the time point tn+1, wherein the second link is a link in the plurality of links except the first link;
   determining a path that can satisfy a transmission rate requirement of the second link; and
   allocating a radio resource of the second link, according to the fourth transmission rate of the second link at the time point tn+1 and the radio resource use information of each wireless transmitter in the plurality of wireless transmitters.

5. The method according to claim 1, wherein the radio resource use information of each wireless transmitter comprises a current transmission rate of each sub-direction antenna of the wireless transmitter, a current transmission rate of an allocated channel of each sub-direction antenna of the wireless transmitter, an available transmission rate increment of the allocated channel of each sub-direction antenna of the wireless transmitter, and an available transmission rate increment of a channel, which can be allocated but is not actually allocated, of each sub-direction antenna of the wireless transmitter, and wherein obtaining the radio resource use information of each wireless transmitter in the plurality of wireless transmitters comprises:

obtaining a current transmission rate of each sub-direction antenna of each wireless transmitter in the plurality of wireless transmitters;

obtaining a current transmission rate of an allocated channel of each sub-direction antenna of each wireless transmitter in the plurality of wireless transmitters;

obtaining signal-to-noise ratios and bandwidth of the allocated channel and an unallocated channel of each sub-direction antenna of each wireless transmitter in the plurality of wireless transmitters;

obtaining an available transmission rate increment of the unallocated channel of each sub-direction antenna of each wireless transmitter in the plurality of wireless transmitter according to the signal-to-noise ratio and the bandwidth of the unallocated channel of each sub-direction antenna of each wireless transmitter in the plurality of wireless transmitters;

obtaining an available transmission rate increment of the allocated channel of each sub-direction antenna of each wireless transmitter in the plurality of wireless transmitters according to the signal-to-noise ratio and the bandwidth of the allocated channel of each sub-direction antenna of each wireless transmitter in the plurality of wireless transmitters and the current transmission rate of the allocated channel of each sub-direction antenna of each wireless transmitter in the plurality of wireless transmitters; and obtaining an available transmission rate increment of each sub-direction antenna of each wireless transmitter in the plurality of wireless transmitters according to the available transmission rate increment of the unallocated channel of each sub-direction antenna of each wireless transmitter in the plurality of wireless transmitters and the available transmission rate increment of the allocated channel of each sub-direction antenna of each wireless transmitter in the plurality of wireless transmitters.

6. The method according to claim 5, further comprising obtaining an available transmission rate increment of an allocated channel in an original transmission path of the first link, an available transmission rate increment of the original transmission path of the first link, and an available transmission rate increment of an unused transmission path of the first link according to the available transmission rate increment of each sub-direction antenna of each wireless transmitter in the plurality of wireless transmitters, wherein determining the path that can satisfy the transmission rate requirement of the first link, and allocating the radio resource of the first link comprises:

keeping the original transmission path and a channel of the first link unchanged when V>V1 and V≤V1+V2, and allocating the radio resource of the first link;

keeping the original transmission path of the first link unchanged when V>V1+V2 and V≤V1+V3, adding a new channel resource to the original transmission path of the first link according to the available transmission rate increment of the allocated channel in the original transmission path of the first link and the available transmission rate increment of the original transmission path of the first link, until all transmission paths of the first link can satisfy a rate requirement of the first transmission rate, and allocating the radio resource of the first link;

adding a new transmission path to the first link according to the available transmission rate increment of the allocated channel in the original transmission path of the first link, the available transmission rate increment of the original transmission path of the first link, and the available transmission rate increment of the unused transmission path of the first link when V>V1+V3, adding new channel resources to the original transmission path and the new transmission path of the first link, until all transmission paths of the first link can satisfy the rate requirement of the first transmission rate, and allocating the radio resource of the first link;

keeping the original transmission path and the channel of the first link unchanged when V1−V≥0 and V1−V<V4, and allocating the radio resource of the first link;

stopping using a first channel in an allocated channel of the first link when V1−V≥V4 and V1−V<V5, and allocating the radio resource of the first link; and stopping using all channels in a first transmission path of the first link when V1−V≥V5, and allocating the radio resource of the first link, wherein V is the first transmission rate, wherein V1 is a sum of current transmission rates of all original transmission paths of the first link, wherein V2 is a sum of available transmission rate increments of allocated channels in all the original transmission paths of the first link, wherein V3 is an available transmission rate increment of the first transmission path of the first link, wherein V4 is a current transmission rate of the first channel in allocated channels in all the transmission paths of the first link, and wherein V5 is a current transmission rate of the first transmission path of the first link.

7. The method according to claim 6, further comprising disabling a first antenna when the first antenna that does not transmit and does not receive any channel exists in a first sub-direction antenna of a first wireless transmitter of the first link.

8. The method according to claim 1, wherein after the path that can satisfy the transmission rate requirement of the first link is determined and the radio resource of the first link is allocated, the method further comprises updating radio resource use information of a wireless transmitter related to the first link.

9. The method according to claim 1, wherein a start time point and an end time point of each time period in the time periods T1, T2, . . . , and Tm are two time points in the time points t1, t2, . . . , and tn.

10. The method according to claim 1, wherein time intervals between any two adjacent time points in the time points t1, t2, . . . , and tn are equal, and wherein time lengths of the time periods T1, T2, . . . , and Tm are equal.

11. A radio network controller, applied to a data center network, wherein the data center network comprises a plurality of wireless transmitters, and wherein the controller comprises:

a memory configured to store instructions; and a processor coupled to the memory, and wherein the instructions cause the processor to be configured to:

obtain transmission rate information of a plurality of links in the data center network at time points t1, t2, . . . , and tn, overall traffic volume information of the plurality of links in time periods T1, T2, . . . , and Tm, and radio resource use information of each wireless transmitter in the plurality of wireless transmitters, wherein each link in the plurality of links is a transmission link between two wireless transmitters in the plurality of wireless transmitters, wherein each time period in the time periods T1, T2, . . . , and Tm comprises at least two time points in the time points t1, t2, . . . , and tn, and wherein any two time periods in the time periods T1, T2, . . . , and Tm do not overlap in time;

predict a first transmission rate of a first link at a time point tn+1 in a time period Tm+1 according to the transmission rate information of the plurality of links at the time points t1, t2, . . . , and tn and the overall traffic volume information of the plurality of links in the time periods T1, T2, . . . , and Tm, wherein the first link is one of the plurality of links, wherein a time period Tj+1 is a time period following a time period Tj, wherein a time point ti+1 is a time point following a time point ti, wherein i and j are integers, wherein $1 \leq i \leq n$, and wherein $1 \leq j \leq m$;

determine a path that can satisfy a transmission rate requirement of the first link; and allocating a radio resource of the first link, according to the first transmission rate of the first link at the time point tn+1 and the radio resource use information of each wireless transmitter in the plurality of wireless transmitters.

12. The controller according to claim 11, wherein the instructions further cause the processor to be configured to:
predict a second transmission rate of the first link at the time point tn+1 according to the transmission rate information of the plurality of links at the time points t1, t2, . . . , and tn;
predict overall traffic volume information of the plurality of links in the time period Tm+1 according to the overall traffic volume information of the plurality of links in the time periods T1, T2, . . . , and Tm; and
modify the second transmission rate of the first link at the time point tn+1 according to the overall traffic volume information of the plurality of links in the time periods T1, T2, . . . , Tm, and Tm+1 in order to obtain the first transmission rate of the first link at the time point tn+1.

13. The controller according to claim 11, wherein the instructions further cause the processor to be configured to determine the first link according to the transmission rate information of the plurality of links at the time points t1, t2, . . . , and tn, wherein the first link is a hot link in the plurality of links, wherein a total transmission rate of the hot link at the time points t1, t2, . . . , and tn is greater than a value obtained by multiplying an average transmission rate of the plurality of links at the time points t1, t2, . . . , and tn by a predetermined coefficient, and wherein the average transmission rate is an average value of total transmission rates of the plurality of links at the time points t1, t2, . . . , and tn.

14. The controller according to claim 11, wherein the instructions further cause the processor to be configured to:
modify a third transmission rate of a second link at the time point tn+1 according to the overall traffic volume information of the plurality of links in the time periods T1, T2, . . . , Tm, and Tm+1 in order to obtain a fourth transmission rate of the second link at the time point tn+1, wherein the second link is a link in the plurality of links except the first link;
determine a path that can satisfy a transmission rate requirement of the second link; and allocate a radio resource of the second link, according to the fourth transmission rate of the second link at the time point tn+1 and the radio resource use information of each wireless transmitter in the plurality of wireless transmitters.

15. The controller according to claim 11, wherein the radio resource use information of each wireless transmitter comprises a current transmission rate of each sub-direction antenna of the wireless transmitter, a current transmission rate of an allocated channel of each sub-direction antenna of the wireless transmitter, an available transmission rate increment of the allocated channel of each sub-direction antenna of the wireless transmitter, and an available transmission rate increment of a channel, which can be allocated but is not actually allocated, of each sub-direction antenna of the wireless transmitter, and wherein the instructions further cause the processor to be configured to:
obtain a current transmission rate of each sub-direction antenna of each wireless transmitter in the plurality of wireless transmitters;
obtain a current transmission rate of an allocated channel of each sub-direction antenna of each wireless transmitter in the plurality of wireless transmitters;
obtain signal-to-noise ratios and bandwidth of the allocated channel and an unallocated channel of each sub-direction antenna of each wireless transmitter in the plurality of wireless transmitters;
obtain an available transmission rate increment of the unallocated channel of each sub-direction antenna of each wireless transmitter in the plurality of wireless transmitters according to the signal-to-noise ratio and the bandwidth of the unallocated channel of each sub-direction antenna of each wireless transmitter in the plurality of wireless transmitters;
obtain an available transmission rate increment of the allocated channel of each sub-direction antenna of each wireless transmitter in the plurality of wireless transmitters according to the signal-to-noise ratio and the bandwidth of the allocated channel of each sub-direction antenna of each wireless transmitter in the plurality of wireless transmitters and the current transmission rate of the allocated channel of each sub-direction antenna of each wireless transmitter in the plurality of wireless transmitters; and
obtain an available transmission rate increment of each sub-direction antenna of each wireless transmitter in the plurality of wireless transmitters according to the available transmission rate increment of the unallocated channel of each sub-direction antenna of each wireless transmitter in the plurality of wireless transmitters and the available transmission rate increment of the allocated channel of each sub-direction antenna of each wireless transmitter in the plurality of wireless transmitters.

16. The controller according to claim 15, wherein the instructions further cause the processor to be configured to:
obtain an available transmission rate increment of an allocated channel in an original transmission path of the first link, an available transmission rate increment of the original transmission path of the first link, and an available transmission rate increment of an unused transmission path of the first link according to the available transmission rate increment of each sub-direction antenna of each wireless transmitter in the plurality of wireless transmitters;

keep the original transmission path and a channel of the first link unchanged when V>V1 and V≤V1+V2, and allocate the radio resource of the first link;

keep the original transmission path of the first link unchanged when V>V1+V2 and V≤V1+V3, add a new channel resource to the original transmission path of the first link according to the available transmission rate increment of the allocated channel in the original transmission path of the first link and the available transmission rate increment of the original transmission path of the first link, until all transmission paths of the first link can satisfy a rate requirement of the first transmission rate, and allocate the radio resource of the first link;

add a new transmission path to the first link according to the available transmission rate increment of the allocated channel in the original transmission path of the first link, the available transmission rate increment of the original transmission path of the first link, and the available transmission rate increment of the unused transmission path of the first link when V>V1+V3, add new channel resources to the original transmission path and the new transmission path of the first link, until all transmission paths of the first link can satisfy the rate requirement of the first transmission rate, and allocate the radio resource of the first link;

keep the original transmission path and the channel of the first link unchanged when V1−V≥0 and V1−V<V4, and allocate the radio resource of the first link;

stop using a first channel in an allocated channel of the first link when V1−V≥V4 and V1−V<V5, and allocate the radio resource of the first link; and stop using all channels in a first transmission path of the first link when V1−V≥V5, and allocate the radio resource of the first link, wherein V is the first transmission rate, wherein V1 is a sum of current transmission rates of all original transmission paths of the first link, wherein V2 is a sum of available transmission rate increments of allocated channels in all the original transmission paths of the first link, wherein V3 is an available transmission rate increment of the first transmission path of the first link, wherein V4 is a current transmission rate of the first channel in allocated channels in all the transmission paths of the first link, and wherein V5 is a current transmission rate of the first transmission path of the first link.

17. The controller according to claim 16, wherein the instructions further cause the processor to be configured to disable a first antenna when the first antenna that does not transmit and does not receive any channel exists in a first sub-direction antenna of a first wireless transmitter of the first link.

18. The controller according to claim 11, wherein the instructions further cause the processor to be configured to update radio resource use information of a wireless transmitter related to the first link.

19. The controller according to claim 11, wherein a start time point and an end time point of each time period in the time periods T1, T2, . . . , and Tm are two time points in the time points t1, t2, . . . , and tn.

20. The controller according to claim 11, wherein time intervals between any two adjacent time points in the time points t1, t2, . . . , and tn are equal, and wherein time lengths of the time periods T1, T2, . . . , and Tm are equal.

* * * * *